US011620838B2

(12) United States Patent
Segal et al.

(10) Patent No.: US 11,620,838 B2
(45) Date of Patent: Apr. 4, 2023

(54) SYSTEMS AND METHODS FOR ANSWERING REGION SPECIFIC QUESTIONS

(71) Applicant: UATC, LLC, San Francisco, CA (US)

(72) Inventors: Sean Segal, Toronto (CA); Wenjie Luo, Toronto (CA); Eric Randall Kee, Pittsburgh, PA (US); Ersin Yumer, Burlingame, CA (US); Raquel Urtasun, Toronto (CA); Abbas Sadat, Toronto (CA)

(73) Assignee: UATC, LLC, Mountain View, CA (US)

( * ) Notice: Subject to any disclaimer, the term of this patent is extended or adjusted under 35 U.S.C. 154(b) by 406 days.

(21) Appl. No.: 17/014,457

(22) Filed: Sep. 8, 2020

(65) Prior Publication Data

US 2021/0150244 A1 May 20, 2021

Related U.S. Application Data

(60) Provisional application No. 63/020,166, filed on May 5, 2020, provisional application No. 62/985,863, filed
(Continued)

(51) Int. Cl.
*G06V 20/62* (2022.01)
*G06F 17/16* (2006.01)
(Continued)

(52) U.S. Cl.
CPC ........ *G06V 20/62* (2022.01); *G06F 16/90332* (2019.01); *G06F 17/16* (2013.01); *G06N 20/00* (2019.01)

(58) Field of Classification Search
None
See application file for complete search history.

(56) References Cited

U.S. PATENT DOCUMENTS

| 10,532,749 | B2* | 1/2020 | Donnelly | .......... B60W 60/0013 |
| 10,864,920 | B1* | 12/2020 | Donnelly | ............... G06V 20/56 |
| 11,334,753 | B2* | 5/2022 | Vallespi-Gonzalez | ....... |
| | | | | G06V 20/584 |

OTHER PUBLICATIONS

Alahi et al., "Social LSTM: Human Trajectory Prediction in Crowded Spaces", Conference on Computer Vision and Pattern Recognition, Jun. 26-Jul. 1, 2016, Las Vegas, NV, 11 pages.
(Continued)

*Primary Examiner* — Dov Popovici
(74) *Attorney, Agent, or Firm* — Dority & Manning, P.A.

(57) ABSTRACT

Systems and methods for answering region specific questions are provided. A method includes obtaining a regional scene question including an attribute query and a spatial region of interest for a training scene depicting a surrounding environment of a vehicle. The method includes obtaining a universal embedding for the training scene and an attribute embedding for the attribute query of the scene question. The universal embedding can identify sensory data corresponding to the training scene that can be used to answer questions concerning a number of different attributes in the training scene. The attribute embedding can identify aspects of an attribute that can be used to answer questions specific to the attribute. The method includes determining an answer embedding based on the universal embedding and the attribute embedding and determining a regional scene answer to the regional scene question based on the spatial region of interest and the answer embedding.

20 Claims, 8 Drawing Sheets

Related U.S. Application Data on Mar. 5, 2020, provisional application No. 62/936,425, filed on Nov. 16, 2019.

(51) Int. Cl.
  *G06F 16/9032* (2019.01)
  *G06N 20/00* (2019.01)

(56) References Cited

OTHER PUBLICATIONS

Antol et al., "VQA: Visual Question Answering", International Conference on Computer Vision, Dec. 11-18, 2015, Santiago, Chile, pp. 2425-2433.
Ben-Younes et al., "MUTAN: Multimodal Tucker Fusion for Visual Question Answering", International Conference on Computer Vision, Oct. 22-29, 2017, Venice, Italy, pp. 2612-2620.
Casas et al., "IntentNet: Learning to Predict Intention from Raw Sensor Data", Conference on Robot Learning (CoRL), Oct. 29-31, 2018, Zurich. Switzerland, 10 pages.
Chen et al., "ABC-CNN: An Attention Based Convolutional Neural Network for Visual Question Answering", arXiv: 1511.05960v1, Nov. 18, 2015, 9 pages.
Devlin et al., "BERT: Pre-training of Deep Bidirectional Transformers for Language Understanding", Conference of the North American Chapter of the Association for Computational Linguistics: Human Language Technologies, NAACL-HLT, Jun. 2-7, 2019, Minneapolis, Minnesota, pp. 4171-4186.
Fukui et al., "Multimodal Compact Bilinear Pooling for Visual Question Answering and Visual Grounding", arXiv:1606.018473v3, Sep. 24, 2016, 12 pages.
Gong et al., "Diverse Sequential Subset Selection for Supervised Video Summarization", onference on Neural Information Processing Systems, Dec. 8-13, 2014, Montreal, Canada, 9 pages.
Hu et al., "Probabilistic Prediction of Vehicle Semantic Intention and Motion", arXiv:1804.03629v1, Apr. 10, 2018, 7 pages.
Ji et al., "Video Summarization with Attention-Based Encoder-Decoder Networks", arXiv:1708.09545v2, Apr. 16, 2018, 9 pages.
Johnson et al., "CLEVR: A Diagnostic Dataset for Compositional Language and Elementary Visual Reasoning", Conference on Computer Vision and Pattern Recognition, Jul. 21-26, 2017, Honolulu, HI, pp. 2901-2910.
Kingma et al., "ADAM: A Method for Stochastic Optimization", arXiv:1412.6980v1, Dec. 22. 2014, 9 pages.
Kipf et al., "Neural Relational Inference for Interacting Systems", arXiv:1802.04687v2, Jun. 6, 2018, 17 pages.
Lee et al., "Discovering Important People and Objects for Egocentric Video Summarization", IEEE Conference on Computer Vision and Pattern Recognition, Jun. 16-21, 2012, Providence, RI, 8 pages.
Lin et al., "Visual Semantic Search: Retrieving Videos via Complex Textual Queries", IEEE Conference on Computer Vision and Pattern Recognition, Jun. 23-28, 2014, Columbus, OH, 8 pages.
Lu et al., "Hierarchical Question-Image Co-Attention for Visual Question Answering", Conference on Neural Information Processing Systems, Dec. 5-10, 2016, Barcelona, Spain, 9 pages.
Lu et al., "Story-driven summarization for egocentric video", Conference on Computer Vision and Pattern Recognition, Jun. 23-28, 2013, Portland, OR, 8 pages.
Maaten et al., "Visualizing Data using t-SNE", Journal of Machine Learning Research, vol. 9, 2008, pp. 2579-2605.
Mikolov et al., "Distributed Representations of Words and Phrases and their Compositionality", Advances in Neural Information Processing Systems, Dec. 5-10, 2013, Lake Tahoe, NV, 9 pages.
Miller et al., "Key-Value Memory Networks for Directlv Reading Documents", Conference on Empirical Methods in Natural Language Processing, Nov. 1-5, 2016, Austin TX, pp. 1400-1409.
Ngo et al., "Automatic Video Summarization by Graph Modeling", International Conference on Computer Vision, Oct. 14-17, 2003, Nice, France, 6 pages.
Phillips et al., "Generalizable Intention Prediction of Human Drivers at Intersections", Jun. 11-14, 2017, Redondo Beach, CA, 6 pages.
Sadeghian et al., "SoPhie: An Attentive GAN for Predicting Paths Compliant to Social and Physical Constraints", Conference on Computer Vision and Pattern Recognition, Jun. 18-22, 2018, Salt Lake City, UT, pp. 1349-1358.
Seo et al., "Bi-Directional Attention Flow for Machine Comprehension", arXiv: 1611.01603v6, Jun. 21, 2018, 13 pages.
Streubel et al., "Prediction of Driver Intended Path at Intersections", Intelligent Vehicles Symposium, Jun. 8-11, 2014, Dearborn, Michigan, pp. 134-139.
Tapaswi et al., "MovieQA: Understanding Stories in Movies through Question-Answering", Conference on Computer Vision and Pattern Recognition, Jun. 26-Jul. 1, 2016, Las Vegas, NV, pp. 4631-4640.
Vaswani et al., "Attention Is All You Need", Conference on Neural Information Processing Systems, Dec. 4-9, 2017, Long Beach, CA, 11 pages.
Wijmans et al., "Embodied Question Answering in Photorealistic Environments with Point Cloud Perception", Conference on Computer Vision and Pattern Recognition, Jun. 16-20, 2019, Long Beach, CA, pp. 6659-6668.
Xu et al., "Ask, Attend and Answer: Exploring Question-Guided Spatial Attention for Visual Question Answering", European Conference on Computer Vision, Oct. 11-14, 2016, The Netherlands, Amsterdam, pp. 451-466.
Yang et al., "PIXOR: Real-time 3D Object Detection from Point Clouds", Conference on Computer Vision and Pattern Recognition, Jun. 18-22, 2018, Salt Lake City, Utah, pp. 7652-7660.
Yang et al., "Stacked Attention Networks for Image Question Answering", Conference on Computer Vision and Pattern Recognition, Jun. 26-Jul. 1, 2016, Las Vegas, NV, pp. 21-29.
Yang et al., "VideoQA: Question Answering on News Video", ACM International Conference on Multimedia, Nov. 2-8, 2003, Berkeley, CA, 10 pages.
Yu et al., "Deep Modular Co-Attention Networks for Visual Question Answering", Conference on Computer Vision and Pattern Recognition, Jun. 16-20, 2019, Long Beach, CA, pp. 6281-6290.
Yu et al., "QANet: Combining Local Convolution with Global Self-Attention for Reading Comphrehension", International Conference on Learning Representations, Apr. 30-May 3, 2018, 16 pages.
Zeng et al., "Leveraging Video Descriptions to Learn Video Question Answering", AAAI Conference on Artificial Intelligence, Feb. 4-9, 2017, San Francisco, CA, pp. 4334-4340.
Zhang et al., "Learning to Count Objects in Natural Images for Visual Question Answering", arXiv:1802.05766, Feb. 15, 2018, 17 pages.
Zhang et al., "Retrospective Encoders for Video Summarization", European Conference on Computer Vision (ECCV), Sep. 8-14, 2018, Munich, Germany, 17 pages.
Zhu et al., "Uncovering the Temporal Context for Video Question Answering", arXiv:1511.04670v1, Nov. 15, 2015, 10 pages.

\* cited by examiner

SYSTEMS AND METHODS FOR ANSWERING REGION SPECIFIC QUESTIONS

RELATED APPLICATION

The present application is based on and claims benefit of U.S. Provisional Patent Application No. 63/020,166 having a filing date of May 5, 2020, U.S. Provisional Patent Application No. 62/985,863 having a filing data of Mar. 5, 2020, and U.S. Provisional Patent Application No. 62/936,425 having a filing date of Nov. 16, 2019, each of which are incorporated by reference herein.

FIELD

The present disclosure relates generally to vehicle perception and testing. In particular, the present disclosure relates to machine-learned models trained to answer questions within a scene.

BACKGROUND

Robots, including autonomous vehicles, can receive data that is used to perceive an environment through which the robot can travel. Robots can rely on machine-learned models to detect objects with an environment. The effective operation of a robot can depend on accurate object detection provided by the machine-learned models. Labelled training data can be used to improve such object detection.

SUMMARY

Aspects and advantages of embodiments of the present disclosure will be set forth in part in the following description, or may be learned from the description, or may be learned through practice of the embodiments.

Aspects of the present disclosure are directed to a method for answering region specific questions. The method can include obtaining a regional scene question including an attribute query and a spatial region of interest for a training scene indicative of a surrounding environment of a vehicle. The method can include obtaining a universal embedding for the training scene. The universal embedding can be indicative of scene data and map data corresponding to the training scene. The scene data can include a plurality of spatially aware three-dimensional scene datapoints representing the training scene. The method can include obtaining an attribute embedding based, at least in part, on the attribute query. The method can include determining an answer embedding based, at least in part, on the universal embedding and the attribute embedding. The method can include determining a regional scene answer to the regional scene question based, at least in part, on the spatial region of interest and the answer embedding. And, the method can include outputting data indicative of the regional scene answer.

Another aspect of the present disclosure is directed to a system for answering region specific questions. The system includes one or more processors and one or more non-transitory computer-readable media that collectively store instructions that, when executed by the one or more processors, cause the system to perform operations. The operations include obtaining a regional scene question including an attribute query and a spatial region of interest for a training scene indicative of a surrounding environment of a vehicle. The operations include obtaining, by one or more machine-learned models, a universal embedding for the training scene. The universal embedding can be indicative of sensory data corresponding to the training scene. The operations include obtaining, by the one or more machine-learned models, an attribute embedding based, at least in part, on the attribute query. The attribute embedding can be previously computed based, at least in part, on a scene attribute associated with the attribute query. The operations include determining, by the one or more machine-learned models, an answer embedding based, at least in part, on the universal embedding and the attribute embedding. And, the operations include determining, by the one or more machine-learned models, a regional scene answer to the regional scene question based, at least in part, on the spatial region of interest and the answer embedding.

Another aspect of the present disclosure is directed to another system for answering region specific questions. The system can include a universal embedding database including a plurality of predetermined universal embeddings, each respective universal embedding of the plurality of predetermined universal embeddings corresponding to a respective training scene indicative of a respective surrounding environment of a vehicle at a respective time step. The system can include an attribute embedding database including an embedding matrix, the embedding matrix can include a plurality of rows, each row corresponding to a respective attribute embedding predetermined for a respective scene attribute of a plurality of predefined scene attributes. The system can include one or more processors and one or more non-transitory computer-readable media that collectively store instructions that, when executed by the one or more processors, cause the system to perform operations. The operations can include obtaining a regional scene question including an attribute query and a spatial region of interest. The operations can include obtaining a universal embedding from the universal embedding database. The operations can include obtaining an attribute embedding based, at least in part, on the attribute query. The operations include determining an answer embedding based, at least in part, on the universal embedding and the attribute embedding. And, the operations can include determining a regional scene answer to the regional scene question based, at least in part, on the spatial region of interest and the answer embedding.

Other example aspects of the present disclosure are directed to other systems, methods, vehicles, apparatuses, tangible non-transitory computer-readable media, and devices for answering region specific questions. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
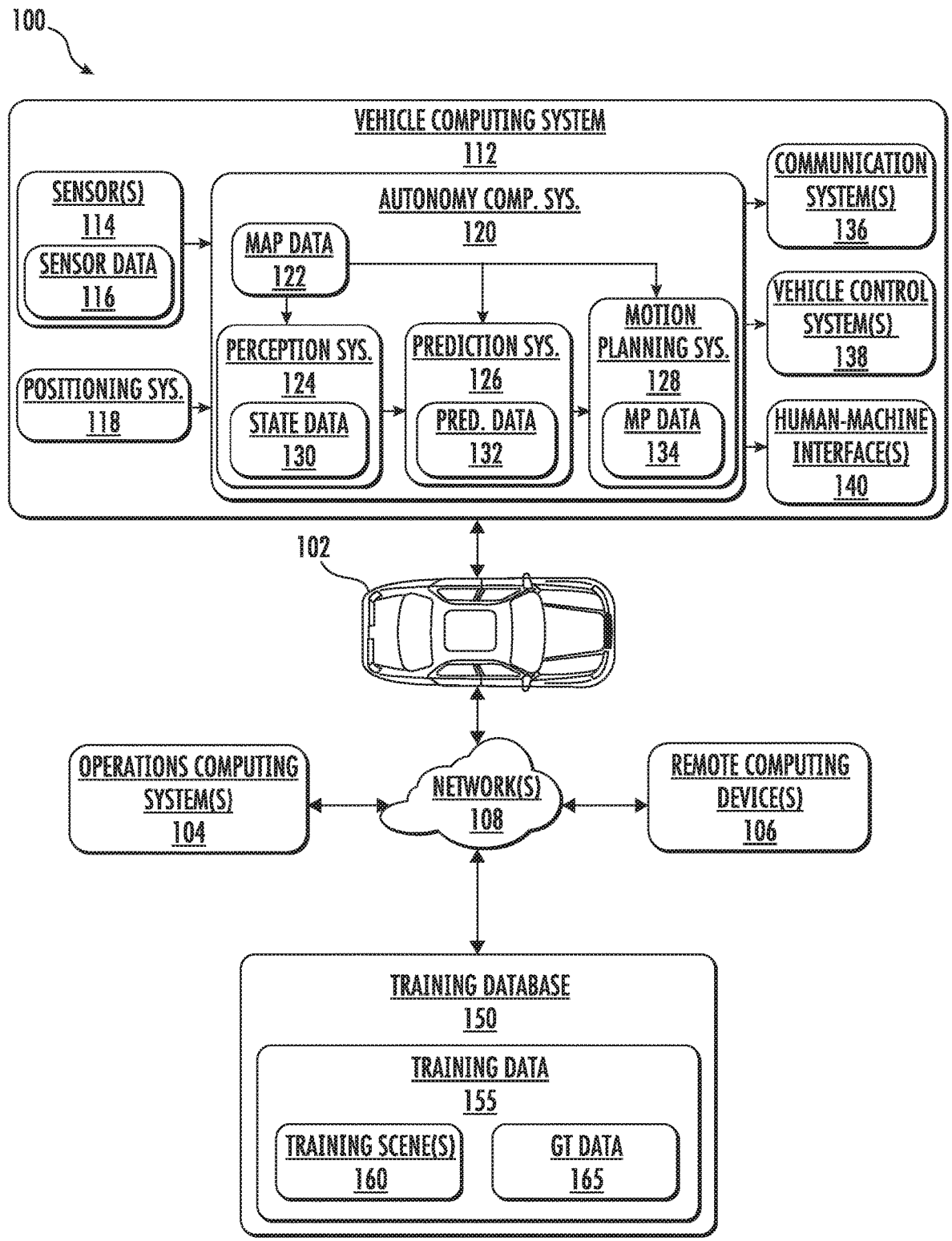
FIG. 1 depicts a block diagram of an example system according to example implementations of the present disclosure.

Aspects of the present disclosure are directed to improved systems and methods for scene processing such as, for example, by answering region specific questions of a surrounding environment of an autonomous vehicle. Robotic systems, such as vehicle computing systems used in autonomous vehicles, can include autonomy systems configured to analyze and make autonomy decisions based on a scene depicting an environment surrounding the system. To do so, the system can utilize various machine-learned models (e.g., deep neural networks, decision trees, support vector machines, etc.) trained to perceive and/or predict an action for one or more objects depicted by the scene. At times, relevance of the one or more objects to a machine-learned model can depend on a spatial region (e.g., in front of a vehicle, on a cross walk, etc.) of the scene within which the objects are located. A computing system can be configured to answer region specific questions for a scene by utilizing a universal spatial embedding encoded with scene information (e.g., map data, contextual data, etc.) corresponding to the spatial dimensions of the scene.

For instance, the computing system can receive a regional scene question that includes a query attribute (e.g., a vehicle/pedestrian density, vehicle action, vehicle interaction with the computing system, map topology, etc.), a spatial region of interest (e.g., area within the scene), and/or a pooling method (e.g., summation function, max function, min function, etc.). The computing system can obtain a previously computed universal spatial embedding for a scene and an attribute embedding based on the regional scene question. The previously computed universal embedding can include encoded past, present, and/or future sensory observations for each of a plurality of datapoints (e.g., voxelized LiDAR datapoints) of the scene. The attribute embedding can include encoded information for a predefined attribute identified by the query attribute of the regional scene question. The computing system can determine an answer embedding that includes a spatially arranged answer map with a classification score and/or a regressed value for each datapoint of the scene by aggregating (e.g., via a fusion operation such as a dot product) the universal spatial embedding and the attribute embedding. The computing system can pool the classification score and/or regressed value for each datapoint of the spatially arranged answer map that corresponds to the spatial region of interest specified in the regional scene question to determine a regional scene answer to the regional scene question. In this manner, the computing system can answer region specific questions within a surrounding environment of a vehicle. This, in turn, enables the computing system to apply region specific training labels to a training data set used to learn machine-learned models, thereby providing an improvement to the functioning of computers by increasing the speed, efficiency, and resulting accuracy of machine-learned models such as those trained via supervised training techniques.

The following describes the technology of this disclosure within the context of an autonomous vehicle for example purposes only. As described herein, the technology described herein is not limited to an autonomous vehicle and can be implemented within other robotic and computing systems, such as those utilizing object detection machine-learned models.

An autonomous vehicle can include a computing system (e.g., a vehicle computing system) with a variety of components for operating with minimal and/or no interaction from a human operator. For example, the computing system can be located onboard the autonomous vehicle and include one or more sensors (e.g., cameras, Light Detection and Ranging (LIDAR), Radio Detection and Ranging (RADAR), etc.), an autonomy computing system (e.g., for determining autonomous navigation), one or more vehicle control systems (e.g., for controlling braking, steering, powertrain), etc. The autonomy computing system can include a number of sub-systems that cooperate to perceive the surrounding environment of the autonomous vehicle and determine a motion plan for controlling the motion of the autonomous vehicle.

The autonomy computing system can include a number of sub-systems that cooperate to perceive the surrounding environment of the autonomous vehicle and determine a motion plan for controlling the motion of the autonomous vehicle. For example, the autonomy computing system can include a perception system configured to perceive one or more objects within the surrounding environment of the autonomous vehicle, a prediction system configured to predict a motion of the object(s) within the surrounding environment of the autonomous vehicle, and a motion planning system configured to plan the motion of the autonomous vehicle with respect to the object(s) within the surrounding environment of the autonomous vehicle. In some implementations, one or more of the number of sub-systems can be combined into one system. For example, an autonomy computing system can include a perception/prediction system configured to perceive and/or predict a motion for one or more objects within the surrounding environment of the autonomous vehicle.

Each of the subsystems can utilize one or more machine-learned models. For instance, the autonomy system can detect and/or predict the action of one or more objects within the surrounding environment of the vehicle by including, employing, and/or otherwise leveraging one or more machine-learned object detection models, object prediction models, etc. The various machine-learned models can be configured to receive scene data (e.g., three-dimensional data (e.g., voxelized LiDAR data) depicting a three-dimensional representation of an environment) associated with one or more objects within the surrounding environment of the autonomous vehicle. The models can determine one or more scene attributes such as, for example, a density of objects, one or more vehicle actions, one or more interactions, and/or a map topology within the surrounding environment of a vehicle based on the scene data. For example, the machine-learned models can be previously trained (e.g., via one or more supervised training techniques) over a plurality of training scenes (e.g., labeled training scenes) to detect the one or more aspects. The machine-learned models can be previously trained by one or more devices (e.g., remote servers, operations computing system, etc.) remote from the autonomous vehicle. For example, a computing system can learn the models over training data stored in a training database.

The training data can include plurality of training scenes, each indicative of a previously observed surrounding environment of an autonomous vehicle at a respective time step. For example, the training data can include a plurality of training scenes previously collected during one or more autonomous vehicle excursions. For instance, the one or more autonomous vehicles can be configured to operate within a plurality of different environments. During an excursion, the one or more vehicles can collect one or more training scenes, via one or more vehicle sensors (e.g., cameras, LiDAR sensors, etc.). The one or more training scenes can be stored onboard the one or more autonomous vehicles and/or remote from the one or more autonomous vehicles (e.g., in the training database of a remote computing system).

Each training scene can include a plurality of spatially-aware three-dimensional scene datapoints (e.g., voxelized LiDAR data, etc.) depicting a surrounding environment of an autonomous vehicle at a first time step. For example, each three-dimensional datapoint can include sensory data (image data, LiDAR data, etc.) for a three-dimensional coordinate of an environment. In some implementations, each training scene can include voxelized LiDAR data. For example, the plurality of spatially-aware three-dimensional scene datapoints can include a plurality of voxelized LiDAR datapoints.

More specifically, each training scene can include a point cloud of three-dimensional datapoints (e.g., volumetric pixels, voxels, etc.) indicative of a surrounding environment of an autonomous vehicle at a respective time step. For instance, the training scene can include a bird's eye view (BEV) point cloud. The BEV point cloud can include a collection of points (e.g., voxelized LiDAR datapoints) that represent a three-dimensional environment surrounding a vehicle. For instance, each scene datapoint can include a set of X, Y, and Z coordinates and sensory data (e.g., image data, texture data, pixel data, etc.) associated with the set of coordinates. The autonomous vehicle, for instance, can be placed at the center of the scene (e.g., with coordinates 0, 0, 0). By way of example, in some implementations, a training scene can include the surrounding environment at a certain distance (e.g., seventy meters) in front and behind of the autonomous vehicle and at another certain distance (e.g., forty meters) to either side of the autonomous vehicle. The respective distances in front of, behind, to the left, and/or to the right can be the same and/or different from one another.

One or more of the plurality training scenes can be associated with ground truth data. Ground truth data, for example, can include an indication of one or more aspects of a respective training scene. For instance, the ground truth data can include a plurality of bounding boxes, classifications, labelled datapoints, etc. By way of example, the ground truth data can include a plurality of region specific labels indicative of one or more aspects of a respective training scene. In some implementations, the ground truth data can be used to learn a machine-learned model configured to generate a universal spatial embedding for each of the plurality of training scenes. As described herein, a computing system can use the universal embedding for each of the plurality of training scenes to answer one or more region specific questions (e.g., regional scene questions) for a training scene. In some implementations, the computing system can generate additional ground truth data by answering the region specific question(s) for one or more training scenes of the training database.

A computing system can previously determine the universal embedding for a training scene by inputting logged data during a period of time to a machine-learned universal embedding model configured to output the universal embedding for the training scene. The machine-learned universal embedding model can include any machine-learned model (e.g., deep neural networks, convolutional neural networks, recurrent neural networks, recursive neural networks, decision trees, logistic regression models, support vector machines, etc.) capable of generating an embedding based on input data. For instance, in some implementations, the machine-learned universal embedding model can include a fully convolutional embedding network. For example, the machine-learned universal embedding model, $f_e^\theta$ can take a representation L of the logged data during a period of time as input and output a spatially-aware universal embedding:

$$E = f_e^\theta(L),$$

where L represents the recorded LiDAR and HD maps.

The logged data can include a collection of sensory observations at one or more time steps over a time period. The collection of sensory observations, for example, can include scene data. The scene data can include training scene data indicative of image data, LiDAR data, etc. captured at a first time step (e.g., the plurality of three-dimensional datapoints of the training scene) and/or contextual scene data indicative of image data, LiDAR data, etc. captured at one or more time steps before and/or after the first time step. As an example, the time period can include two seconds. In such a case, the scene data can include image data, LiDAR data, etc. captured one second before the first time step and one second after the first time step.

By way of example, the scene data can include the plurality of spatially-aware three-dimensional scene datapoints that represent the training scene. As described herein, the plurality of three-dimensional scene datapoints can include voxelized LiDAR datapoints. In addition, the scene data can include a plurality of three-dimensional spatially-aware contextual datapoints representing a plurality of contextual scenes. The plurality of contextual scenes, for example, can be indicative of the surrounding environment of the vehicle within the training scene at one or more time steps different than the first time step.

For instance, the plurality of three-dimensional contextual datapoints can include a plurality of three-dimensional subsequent datapoints corresponding to one or more subsequent time steps after the first time step and/or a plurality of three-dimensional preceding datapoints corresponding to one or more preceding time steps before the first time step. Each of the plurality of three-dimensional subsequent datapoints and/or the plurality of three-dimensional preceding datapoints can include a subsequent voxelized LiDAR datapoint and/or preceding voxelized LiDAR datapoint, respectively. Each voxelized LiDAR datapoint can include a three-dimensional coordinate with one or more corresponding sensory observations such as, for example, gradients, image data, etc. In this manner, the logged data (e.g., the scene data) can include past, present, and/or future information associated with a training scene.

In addition, or alternatively, the logged data can include a vehicle pose during the collection of the sensory observations and/or high definition map data at the one or more time steps. The vehicle pose, for example, can include one or more attributes (e.g., steering attributes, heading attributes, etc.) of the ego vehicle (e.g., the autonomous vehicle centered within the training scene). The map data can include rasterized map data at the first time step and/or each time step of the time period. For example, the map data can include rasterized map data corresponding to the training scene and/or rasterized map data corresponding to the plurality of contextual scenes. The rasterized map data can be indicative of one or more geographical features of the training scene such as, for example, one or more travel ways, intersections, crosswalks, traffic signs, etc.

The computing system can input the logged data (e.g., the map data, the scene data, vehicle pose, etc.) corresponding to the training scene into the machine-learned universal embedding model to receive the universal embedding. In some implementations, the computing system can construct representations L to provide the machine-learned universal embedding model $f_e^\theta$ with a receptive field of time steps, which are preprocessed in a fully convolutional manner across the time dimension. The LiDAR data across the time dimension T can be corrected for ego-motion to bring the point clouds (e.g., subsequent/preceding three-dimensional datapoints) from all timesteps (e.g., subsequent/preceding timesteps) into the same coordinate system, centered at the current location of the autonomous vehicle within the training scene. The computing system can rasterize the space into a three-dimensional occupancy grid, where each voxel has a binary value indicating whether it contains a LiDAR point. In this manner, representations L can include dimensions H×W×(ZT), where Z and H, W are the height and x-y dimensions respectively.

In some implementations, the computing system can include the map data within the representation L, for example, to describe the semantics of the training scene. To do so, the computing system can rasterize the map data into M channels, each representing a different element (e.g., road, intersection, lane, lane boundaries, traffic lights, etc.). In this manner, the full input representation, L, can include a tensor of size H×W×(ZT+M). The universal embedding, E, computed by the machine-learned universal embedding model $f_e^\theta$ can be shaped with a size H/r×W/r×$D_e$, where r is a spatial downsampling rate, and $D_e$ is the embedding dimension.

The machine-learned universal embedding model can be learned to output the universal embedding based on the map data, scene data, and/or vehicle pose. For example, the machine-learned universal embedding model can generate the universal embedding, E, for the training scene by processing the voxelized LiDAR datapoints and the rasterized map with independent backbones. The map and LiDAR features, at multiple resolutions, can be upsampled and concatenated together. The concatenated features can be input to a convolutional header to obtain the universal embedding.

In some implementations, the computing system can determine a respective universal embedding for each of the plurality of training scenes of the training database. For example, the computing system can include and/or have access to a universal embedding database. The universal embedding database can include a plurality of predetermined universal embeddings. Each respective universal embedding of the plurality of predetermined universal embeddings can correspond to a respective training scene indicative of a respective surrounding environment of an autonomous vehicle at a respective time step. The respective training scene, for example, can include a training scene from the training database.

The universal embedding for a respective training scene can be indicative of scene data and map data corresponding to the respective training scene. The universal embedding for each of the plurality of training scenes of the training database can be attribute agnostic. For example, the universal embedding for each of the plurality of training scenes of the training database can be independent from each of a plurality of predefined scene attributes. This, in turn, allows the universal embedding for a respective training scene to be used to reason about any of a plurality of predefined scene attributes within the scene. For instance, a question for a training scene can include a query attribute indicative of an attribute of the training scene. A query attribute can include at least one of a plurality of predefined scene attributes. The plurality of predefined scene attributes can include at least one of a vehicle action corresponding to a respective vehicle within the training scene, a density of objects within the training scene, and/or a map topology represented by the training scene.

The machine-learned universal embedding model $f_e^\theta$ can be attribute agnostic and, therefore, not depend on any particular query (e.g., about a scene attribute). This can allow the model to efficiently share the computation of important intermediate features that may be relevant to multiple questions. In addition, this can enable the universal embedding to be precomputed for fast question answering beneficial in a retrieval setting. In this manner, the universal embedding can include data sufficient to determine answers to a plurality of questions concerning one or more scene attributes. For example, the same universal embedding can be used to determine a vehicle action corresponding to a respective vehicle within a scene, a density of objects within a scene, a map topology within a scene, etc.

In some implementations, the computing system can determine a respective attribute embedding for each of the plurality of predefined attributes. Each attribute embedding, for example, can be previously computed based on a respective scene attribute. For instance, in some implementations, the computing system can include and/or have access to an attribute embedding database. The attribute embedding database can include a plurality of previously computed attribute embeddings including, for example, a respective attribute embedding for each scene attribute of a plurality of predefined scene attributes. For example, in some implementations, the attribute embedding database can include an embedding matrix. The embedding matrix can include a plurality of rows, each row corresponding to an attribute key. For instance, each row can correspond (via an attribute key) to a respective attribute embedding predetermined for a respective scene attribute of a plurality of predefined scene attributes. By way of example, the embedding matrix can include a look-up matrix with each row keyed to a respective attribute embedding for a respective scene attribute.

For instance, an attribute embedding representation can be learned for each predefined attribute to capture relationships between each of the predefined scene attributes. For example, attributes such as "a vehicle is braking" and "a vehicle is braking due to another vehicle" can be related because they both involve a related vehicle action (e.g., vehicle braking). Such attributes can depend on similar dimensions in an attribute embedding. Moreover, other attributes such as "map has a three-way intersection" can be related because, for example, the vehicle may be braking at the three-way intersection. The attribute embedding for each predefined scene attribute can capture these relationships through the embedding matrix.

By way of example, the embedding matrix can include a learnable embedding matrix K with dimensions $|X| \times D_k$ where $D_k$ is an attribute embedding dimension. In some implementations, the attribute embeddings and the universal embedding can have equal dimensions. Each row in the matrix can correspond to an attribute $q_x \in X$. Given a question (e.g., a regional scene question), q, the attribute embedding function can be defined $Q(\cdot)$, and $$Q(q)=K[q_x],$$

where [·] denotes an indexing operation. The computing system can efficiently answer a question concerning a predefined scene attribute by searching the embedding matrix to quickly obtain a corresponding attribute embedding.

As an example, the computing system can obtain a regional scene question. The regional scene question can include an attribute query, a spatial region of interest, and/or a pooling function for a training scene indicative of a surrounding environment of a vehicle. For example, the training scene can include a respective training scene from the training database. The spatial region of interest can be indicative of a spatial area within the training scene. The spatial area within the training scene can include a specific location at a specific area within the scene and/or a relative location at an area relative to an object with the scene. For example, the spatial region of interest can include scene coordinates indicative of a specific location. In addition, or alternatively, the spatial region of interest can include a map descriptor indicative of a static area (e.g., crosswalk, intersection, etc.) within the training scene and/or an area relative to a dynamic object (e.g., the ego vehicle, another vehicle, a pedestrian, etc.). For instance, the autonomous vehicle (e.g., the ego vehicle) can be centered within the training scene and the spatial region of interest can be relative to the vehicle. By way of example, the spatial region of interest can include an area in front, behind, and/or to one or more sides of the autonomous vehicle centered within the training scene.

The computing system can define a question answering problem for the regional scene question as a learning function f that outputs a regional scene answer:

$$a=f(L,q)$$

where L is the representation of the logged data (e.g., scene data, map data, etc.) corresponding to the training scene within a window of time (e.g., seconds, minutes, etc.), and q is the regional scene question. The regional scene question can be encoded as a tuple $q=(q_x, q_R, q_P)$, where $q_x \in X$ is an attribute from the plurality of predefined attributes X, $q_R$ is the spatial region of interest, and $q_P$ defines how values are pooled across the region of interest. By way of example, to encode the regional scene question "How many pedestrians are within 10 meters in front of the SDV?", $q_x$ could reference a predefined "pedestrian counting" scene attribute, $q_R$ could encode the region 10 meters in front of the vehicle, and $q_P$ could encode that the attribute values at each spatial location can be pooled together via a summation function.

The computing system can obtain a universal embedding for the training scene. In some implementations, the universal embedding can be obtained from the universal embedding database. As described herein, the universal embedding can be indicative of sensory data corresponding to the training scene. For instance, the universal embedding can be indicative of scene data including a plurality of spatially-aware three-dimensional scene datapoints. In some implementations, the spatial area within the training scene can correspond to one or more of the plurality of spatially-aware three-dimensional scene datapoints. In addition, or alternatively, the computing system can be configured to retrieve a plurality of training scenes that satisfy the regional scene question. For example, given the training database L, the same regional scene question can be evaluated (e.g., in the manner described herein) on all timesteps for every training scene of the plurality of training scenes. The results can be ranked by their similarity to a desired answer.

The computing system can obtain an attribute embedding based on the attribute query. The attribute query, for example, can identify a predefined attribute of the plurality of predefined attributes. The attribute embedding can be previously computed based on the scene attribute associated with the attribute query. In this manner, the attribute embedding can be one embedding of the plurality of previously computed attribute embeddings, for example, of the attribute embedding database. In some implementations, the computing system can obtain the attribute embedding by searching the embedding matrix (e.g., of the embedding database) to retrieve the attribute embedding from a respective row of the embedding matrix corresponding to the scene attribute associated with the attribute query. For example, given a regional scene question, the computing system can look up an embedding representation for the particular attribute.

The computing system can determine an answer embedding based on the universal embedding and the attribute embedding. For example, the computing system can extract relevant information from the universal embedding and the attribute embedding to produce an answer embedding that includes an answer at each spatial location within the training scene. The answer embedding, for example, can include at least one answer value for each scene datapoint of the plurality of spatially-aware three-dimensional scene datapoints representing the training scene. The answer value for each scene datapoint of the plurality of three-dimensional scene datapoints, for example, can include at least one of a classification confidence score and/or a regressed value.

By way of example, given the universal embedding E and the attribute embedding k=Q(q) as input, the computing system (e.g., a machine-learned answering module) can return an answer, $$A=f_a(E,k),$$

where A is a matrix of size H/r×W/r matching the spatial dimensions of E. To fuse the information from the universal embedding and the query embedding, the computing system can use a parameter free approach. For instance, the answer at each spatial location can be:

$$f_a(E,k)=E \cdot k,$$

where multiplication can imply tensor contraction of E with the attribute embedding vector k along the embedding dimension (broadcasting). This can be facilitated, in some implementations, when $D_e = D_k$. By applying the fusion operation, the computing system can obtain the spatially-arranged answer map A with dimensions H/r×W/r. The spatially-arranged answer map can include a plurality of elements representing a classification confidence score and/or a regressed value at a given location. In some implementations, the element can depend on the regional scene question and a loss function used to train a machine-learned answering module.

The computing system can determine a regional scene answer to the regional scene question based on the spatial region of interest and the answer embedding. For example, the regional scene answer can be indicative of the answer value for each of the one or more scene datapoints corresponding to the spatial area within the training scene. By way of example, the computing system can aggregate the answer value for each scene datapoint corresponding to the spatial area within the training scene based, at least in part, on the pooling function of the regional scene question. The computing system can output the regional scene answer in response to the regional scene question.

As described herein, the pooling function can indicate a manner in which answer values can be pooled together to answer a regional scene question. For instance, the pooling function can include at least one of a summation function, a max function, and/or any other function for aggregating a number of disparate values. As an example, a summation function can be configured to add a respective regressed value for each scene datapoint corresponding to a spatial area (e.g., the spatial region of interest) of the training scene. As another example, a max function can be configured to find the highest classification confidence score of each scene datapoint corresponding to the spatial area (e.g., the spatial region of interest) of the training scene. In some implementations, the pooling function can be determined based on the regional scene question. For example, the regional scene question can include a query attribute for "counting pedestrians," in such a case, the pooling function can include a summation function to add every pedestrian detected within the spatial region of interest.

By way of example, the answering module can utilize pooling to answer a from the spatial answer map A and regional scene question q, $$a=f_P(A,q).$$

For instance, in the event the regional scene question relates to counting the number of pedestrians in the training scene, the pooling operator, $q_P$, can be set to the sum function. In such a case, the pooling operation can include $$f_P(A,q)=\Sigma_{(h,w)\in q_R}A[h,w].$$

In addition, or alternative, in the event the regional scene question relates to whether a particular scenario is present somewhere in the spatial region of interest (e.g., "Is the car turning right in front of the vehicle?"), the pooling function can be set the max function. In such a case, the highest confidence score at any spatial location within the spatial region of interest can be used as the final confidence score. For instance, the pooling function can include:

$$f_P(A,q)=\max_{(h,w)\in q_R}A[h,w].$$

The machine-learned models disclosed herein can be trained using one or more machine-learning techniques. For instance, the machine-learned universal embedding model and an attribute embedding model used to determine the plurality of attribute embeddings can be jointly trained end-to-end. By way of example, let $\Theta=\{\theta, K\}$ be the collection of model parameters. Given a training dataset (e.g., the training database), $D_{train}$, in which each example $(L, q, a) \in D_{train}$ includes a data log representation L (e.g., training scene, map data, etc.) at a particular time step, a regional scene question q, and the ground truth a to that regional scene question, the computing system can train the machine-learned models to minimize a query loss.

For example, the models can be trained to minimize loss across all questions from the training dataset, $$\min_\Theta \sum_{(L,q,a)\in D_{train}} l_{q_x}(f_\Theta(L, q), a)$$

the loss function for a particular regional scene question, for example, can depend on the query attribute, $q_x$, as different loss function can work best depending on both the support and distribution of regional scene answers. For example, a classification loss such as like cross entropy loss can be used for regional scene questions that relate to binary attributes (e.g., vehicle changing lanes). In addition, or alternatively, a variety of loss functions such as a standard mean-squared error regression loss can be used for regional scene questions that relate to continuous valued attributes (e.g., vehicle density).

In some implementations, the training set can include a subset of training scenes from the training database. For example, the training set can include data log representations $L \in L_{train}$ at varying time steps, with supervision for a giver set of attributes $X_{train}$. In this manner, an oracle O can be implemented that provided ground-truth answers to any regional scene question, q, $$a^*=O(L,q).$$

Given O, the computing system can produce a training set, $D_{train}$, with examples $(L, q, a^*) \in D_{train}$. During training of the machine-learned models, the computing system can sample a query attribute, $q_x$, uniformly from $X_{train}$, then sample from a set of log frames that are "interesting" for $q_x$. For instance, for each query attribute $q_x \in X_{train}$, the computing system can preprocess the dataset to find a subset of training log frames where there exists some spatial region with a positive example (for classification) or a non-zero value (for regression). This can ensure that the answer distributions for each query attribute is relatively balanced.

Example aspects of the present disclosure can provide a number of improvements to machine-learning computing technology and robotics computing technology such as, for example, by processing scenes for training machine-learned perception models. For instance, the systems and methods of the present disclosure provide an improved approach for training machine-learning perception models such as those used to detect attributes of a scene depicting a surrounding environment of a vehicle. For example, a computing system can obtain a regional scene question including an attribute query and a spatial region of interest for a training scene indicative of a surrounding environment of a vehicle. The computing system can obtain a universal embedding for the training scene. The universal embedding can be indicative of scene data and map data corresponding to the training scene. The scene data can include a plurality of spatially aware three-dimensional scene datapoints representing the training scene. The computing system can obtain an attribute embedding based, at least in part, on the attribute query. The computing system can determine an answer embedding based, at least in part, on the universal embedding and the attribute embedding. The computing system can determine a regional scene answer to the regional scene question based, at least in part, on the spatial region of interest and the answer embedding. And, the computing system can output data indicative of the regional scene answer. In this manner, the present disclosure presents an improved computing system that can effectively train a machine-learned model.

The computing system employs improved scene processing techniques that leverage a universal spatially aware embedding to answer regional questions within a scene. As a result, the computing system is able to increase the speed and efficiency of training machine-learned models, generally, by automatically labelling regions of training scenes used during training. Moreover, by determining a universal embedding for each of a plurality of training scenes, the computing system can automatically retrieve subsets of the plurality of scenes with common attributes. In this manner, the computing system can accumulate and utilize newly available information such as, for example, the universal spatial embeddings to provide a practical improvement to machine-learning technology (e.g., machine-learning training technology). This, in turn, improves the functioning of machine-learning systems in general by increasing the speed and efficiency training data retrieval. Ultimately, the training techniques disclosed herein result in more accurate machine-learned systems; thereby improving the predictions of machine-learned systems once deployed (e.g., in autonomous vehicles).

Furthermore, although aspects of the present disclosure focus on the application of training techniques described herein to predictive models utilized in autonomous vehicles, the systems and methods of the present disclosure can be used to train any machine-learned model. Thus, for example, the systems and methods of the present disclosure can be used to train machine-learned models configured for object detection, image processing, etc.

Various means can be configured to perform the methods and processes described herein. For example, a computing system can include data obtaining unit(s), universal embedding unit(s), attribute embedding unit(s), answer embedding unit(s), regional answer unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain data, for example, such as a regional scene question including an attribute query and a spatial region of interest for a training scene indicative of a surrounding environment of a vehicle. The means (e.g., universal embedding unit(s), etc.) can be configured to obtain a universal embedding for the training scene. The universal embedding can be indicative of scene data and map data corresponding to the training scene. For instance, the scene data can include a plurality of spatially aware three-dimensional scene datapoints representing the training scene.

The means (e.g., attribute embedding unit(s), etc.) can be configured to obtain an attribute embedding based, at least in part, on the attribute query. The means (e.g., answer embedding unit(s), etc.) can be configured to determine an answer embedding based, at least in part, on the universal embedding and the attribute embedding. The means (e.g., regional answer unit(s), etc.) can be configured to determine a regional scene answer to the regional scene question based, at least in part, on the spatial region of interest and the answer embedding. In addition, the means (e.g., regional answer unit(s), etc.) can be configured to output data indicative of the regional scene answer.

With reference now to FIGS. 1-8, example embodiments of the present disclosure will be discussed in further detail. FIG. 1 depicts an example system 100 overview according to example implementations of the present disclosure. More particularly, FIG. 1 illustrates a vehicle 102 (e.g., ground-based vehicle, bikes, scooters, and other light electric vehicles, etc.) including various systems and devices configured to control the operation of the vehicle. For example, the vehicle 102 can include an onboard vehicle computing system 112 (e.g., located on or within the autonomous vehicle) that is configured to operate the vehicle 102. Generally, the vehicle computing system 112 can obtain sensor data 116 from a sensor system 114 onboard the vehicle 102, attempt to comprehend the vehicle's surrounding environment by performing various processing techniques on the sensor data 116, and generate an appropriate motion plan 134 through the vehicle's surrounding environment.

As illustrated, FIG. 1 shows a system 100 that includes the vehicle 102; a communications network 108; an operations computing system 104; one or more remote computing devices 106; the vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; and a training database 150.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 102 and/or its users to coordinate a vehicle service provided by the vehicle 102. To do so, the operations computing system 104 can communicate with the one or more remote computing devices 106 and/or the vehicle 102 via one or more communications networks including the communications network 108. The communications network 108 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including sending and/or receiving data or signals to and from the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices such as, for example, one or more operator devices associated with one or more vehicle operators, user devices associated with one or more vehicle passengers, developer devices associated with one or more vehicle developers (e.g., a laptop/tablet computer configured to access computer software of the vehicle computing system 112), etc. One or more of the devices can receive input instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, an acceleration, a trajectory, a heading, and/or a path of the vehicle 102 based in part on signals or data exchanged with the vehicle 102. In some implementations, the operations computing system 104 can include the one or more of the remote computing devices 106.

The vehicle 102 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 102 can be an autonomous vehicle that can perform various actions including driving, navigating, and/or operating, with minimal and/or no interaction from a human driver.

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 102) various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing devices 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 102 around the current and/or predicted locations of one or more objects detected by the one or more sensors 114. The autonomy computing system 120 can control the one or more vehicle control systems 138 to operate the vehicle 102 according to the motion plan.

The autonomy computing system 120 can identify one or more objects that are proximate to the vehicle 102 based at least in part on the sensor data 116 and/or the map data 122. For example, the perception system 124 can obtain state data 130 descriptive of a current and/or past state of an object that is proximate to the vehicle 102. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems 124, 126 (and/or other systems) can be combined into one system and share computing resources.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat). For example, the autonomy computing system 120 can provide one or more outputs including a graphical display of the location of the vehicle 102 on a map of a geographical area within one kilometer of the vehicle 102 including the locations of objects around the vehicle 102. A passenger of the vehicle 102 can interact with the one or more human-machine interfaces 140 by touching a touchscreen display device associated with the one or more human-machine interfaces to indicate, for example, a stopping location for the vehicle 102.

The vehicle computing system 112 can communicate data between the vehicle 102 and the human-machine interface 140. The data can be communicated to and/or from the vehicle 102 directly and/or indirectly (e.g., via another computing system). For example, in some implementations, the data can be communicated directly from the vehicle computing system 112 to the human-machine interface 140. In addition, or alternatively, the vehicle computing system 112 can communicate with the human-machine interface 140 indirectly, via another computing system, such as, for example, a system of a third party vehicle provider/vendor.

In some implementations, each of the autonomous subsystems (e.g., perception system 124, prediction system 126, motion planning system 128, etc.) can utilize one or more machine-learned models. For instance, the autonomy system 120 can detect and/or predict the action of one or more objects within the surrounding environment of the vehicle 102 by including, employing, and/or otherwise leveraging one or more machine-learned object detection models, object prediction models, etc. The various machine-learned models can be configured to receive scene data (e.g., three-dimensional data (e.g., voxelized LiDAR data) depicting a three-dimensional representation of an environment) associated with one or more objects within the surrounding environment of the vehicle 102. The models can determine one or more scene attributes such as, for example, a density of objects, one or more vehicle actions, one or more interactions, and/or a map topology within the surrounding environment of a vehicle 102 based on the scene data. For example, the machine-learned models can be previously trained (e.g., via one or more supervised training techniques) over a plurality of training scenes (e.g., labeled training scenes) to detect the one or more aspects. The machine-learned models can be previously trained by the one or more remote computing devices 106, the operations computing system(s) 104, and/or any other device (e.g., remote servers, training devices, etc.) remote from the vehicle 102. For example, a computing system (e.g., a remote computing device 106, operations computing system 104, etc.) can learn the models over training data 155 stored in a training database 150.

The training data 155 can include a plurality of training scenes 160, each indicative of a previously observed surrounding environment of an autonomous vehicle at a respective time step. For example, the training data 155 can include a plurality of training scenes 160 previously collected during one or more autonomous vehicle excursions. For instance, the one or more autonomous vehicles can be configured to operate within a plurality of different environments. During an excursion, the one or more vehicles can collect one or more training scenes, via one or more vehicle sensors (e.g., cameras, LiDAR sensors, etc.) of the respective vehicle (e.g., sensors 114 of vehicle 102). The one or more training scenes can be stored onboard the one or more autonomous vehicles, such as on vehicle computing system 102 and/or remote from the one or more autonomous vehicles, such as in the training database 150 of a remote computing system (e.g., operations computing system 104, remote computing device 106, etc.).

Each training scene can include a plurality of spatially-aware three-dimensional scene datapoints (e.g., voxelized LiDAR data, etc.) depicting a surrounding environment of an autonomous vehicle at a first time step. For example, each three-dimensional datapoint can include sensory data (image data, LiDAR data, etc.) for a three-dimensional coordinate of an environment. In some implementations, each training scene can include voxelized LiDAR data. For example, the plurality of spatially-aware three-dimensional scene datapoints can include a plurality of voxelized LiDAR datapoints.

More specifically, each training scene can include a point cloud of three-dimensional datapoints (e.g., volumetric pixels, voxels, etc.) indicative of a surrounding environment of an autonomous vehicle at a respective time step. For instance, the training scene can include a bird's eye view (BEV) point cloud. The BEV point cloud can include a collection of points (e.g., voxelized LiDAR datapoints) that represent a three-dimensional environment surrounding a vehicle. For instance, each scene datapoint can include a set of X, Y, and Z coordinates and sensory data (e.g., image data, texture data, pixel data, etc.) associated with the set of coordinates. The autonomous vehicle, for instance, can be placed at the center of the scene (e.g., with coordinates 0, 0, 0). By way of example, in some implementations, a training scene can include the surrounding environment at a certain distance (e.g., seventy meters) in front and behind of the autonomous vehicle and at another certain distance (e.g., forty meters) to either side of the autonomous vehicle. The respective distances in front of, behind, to the left, and/or to the right can be the same and/or different from one another.

One or more of the plurality training scenes 160 can be associated with ground truth data 165. Ground truth data 165, for example, can include an indication of one or more aspects of a respective training scene. For instance, the ground truth data 165 can include a plurality of bounding boxes, classifications, labelled datapoints, etc. By way of example, the ground truth data 165 can include a plurality of region specific labels indicative of one or more aspects of a respective training scene. For example, the training database 150 can include a large scale self-driving dataset consisting of roughly 40 hours of driving over multiple cities across North America. The training data 155 can be split into 4857 data logs (e.g., training scene(s) 160) for training, 477 for validation, and 960 for testing. For training the data logs can be sampled across time at 10 Hz to obtain $|L_{train}| \approx |M|$ log representations. For evaluation, the data logs can be sampled at 2 Hz to $|L_{val}| \approx 20K$, $|L_{train}| \approx 40K$. For every time step in a log, the training data 155 can include bounding box labels (e.g., ground truth data 165) for each actor along with labels for their current action and interactions. In addition, or alternatively, the ground truth data 165 can include an identification of intersections and intersection types (e.g., a 3-way intersection, 4-way stop, etc.).

In some implementations, the ground truth data 165 can be used to learn machine-learned models configured to generate a universal spatial embedding for each of the plurality of training scenes 160. As described herein, a computing system (e.g., a training computing system) can use the universal embedding for each of the plurality of training scenes 160 to answer one or more region specific questions (e.g., regional scene questions) for a training scene. In some implementations, the computing system can generate additional ground truth data 165 by answering the region specific question(s) for one or more training scenes of the training database 150. For example, the computing system can generate a plurality of region specific labels for one or more training scenes of the training database 150. By way of example, the computing system can answer one or more region specific questions for a training scene and label the training scene with the answer. For instance, the computing system can associate the answer with the training scene and store the training scene and the associated answer in the training database. In this manner, the training database 150 can be searched by regional specific answers (e.g., a number of pedestrians within a spatial region of scene, a car turning in front of another vehicle, etc.).

As an example, and as discussed in further detail below, the computing system can obtain a universal embedding for a training scene of the training database 150. The computing system can obtain an attribute embedding for the training scene based on at least one intended training label. For instance, the computing system can obtain an attribute embedding for each scene attribute associated with the training scenes of the training database. The computing system can determine an answer embedding based, at least in part, on the universal embedding and the attribute embedding. The computing system can generate a training label for the training scene based, at least in part, on the universal embedding and the attribute embedding and store the training label with the training scene at the training database. For instance, the training label can identify whether a training scene includes a scene attribute at one or more spatial regions within the training scene.

Figure 2:
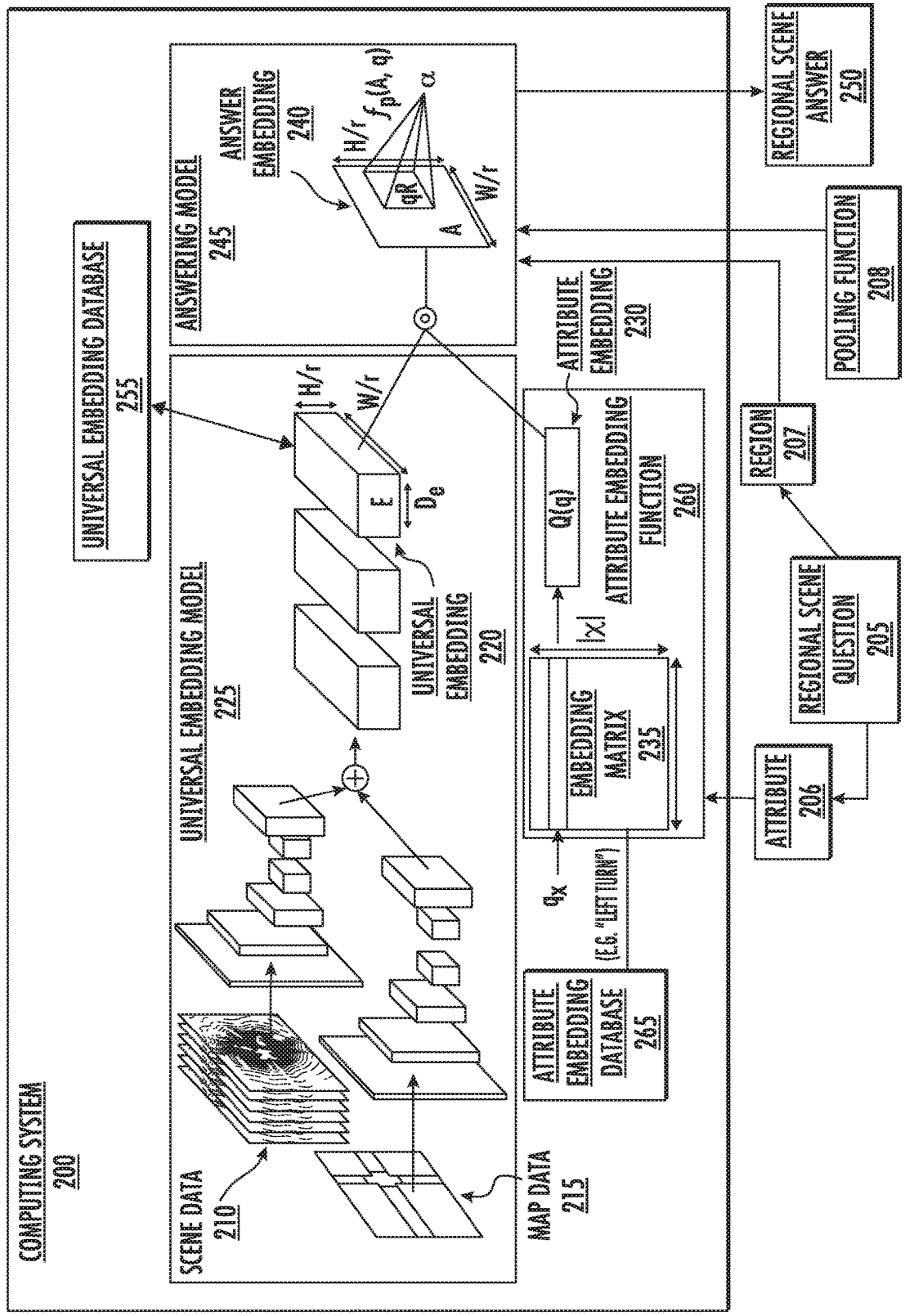
FIG. 2 depicts a system for determining a regional scene answer to a regional scene question according to example implementations of the present disclosure.

For example, FIG. 2 depicts a system 200 for determining a regional scene answer to a regional scene question according to example implementations of the present disclosure. A computing system 200 (e.g., a training computing system) can utilize various machine-learned models to determine a regional scene answer. For instance, FIG. 2 depicts a machine-learned universal embedding model 225, an embedding matrix 235, and a machine learned answering module 245. As described herein, the computing system 200 can include, employ, and/or otherwise leverage the machine-learned universal embedding model 225, the embedding matrix 235, and/or the machine-learned answering module 245 to determine a regional scene answer 250 to a regional scene question 205.

The computing system 200 can previously determine a universal embedding 220 (e.g., a universal spatial embedding) for a training scene by inputting logged data (e.g., scene data 210, map data 215, etc.) during a period of time to a machine-learned universal embedding model 225 configured to output the universal embedding 220 for the training scene. The machine-learned universal embedding model 225 can include any machine-learned model (e.g., deep neural networks, convolutional neural networks, recurrent neural networks, recursive neural networks, decision trees, logistic regression models, support vector machines, etc.) capable of generating an embedding (e.g., a universal spatial embedding) based on input data. For instance, in some implementations, the machine-learned universal embedding model 225 can include a fully convolutional embedding network. For example, the machine-learned universal embedding model 225 can be denoted as: $f_e^\theta$ and can take a representation of the logged data (e.g., denoted L) during a period of time as input and output a spatially-aware universal embedding 220 denoted as:

$$E = f_e^\theta(L),$$

where L represents scene data 210 such as recorded LiDAR data, image data, etc. and map data 215 such as high definition maps, rasterized maps, etc.

The logged data, L, can include a collection of sensory observations at one or more time steps over a time period. The collection of sensory observations, for example, can include scene data 210. The scene data 210 can include training scene data indicative of image data, LiDAR data, etc. captured at a first time step (e.g., the plurality of three-dimensional datapoints of the training scene) and/or contextual scene data indicative of image data, LiDAR data, etc. captured at one or more time steps before and/or after the first time step. As an example, the time period can include two seconds. In such a case, the scene data 210 can include image data, LiDAR data, etc. captured one second before the first time step and one second after the first time step.

By way of example, the scene data 210 can include the plurality of spatially-aware three-dimensional scene datapoints that represent the training scene. As described herein, the plurality of three-dimensional scene datapoints can include voxelized LiDAR datapoints. In addition, the scene data 210 can include a plurality of three-dimensional spatially-aware contextual datapoints representing a plurality of contextual scenes. The plurality of contextual scenes, for example, can be indicative of the surrounding environment of the vehicle within the training scene at one or more time steps different than the first time step.

For instance, the plurality of three-dimensional contextual datapoints can include a plurality of three-dimensional subsequent datapoints corresponding to one or more subsequent time steps after the first time step and/or a plurality of three-dimensional preceding datapoints corresponding to one or more preceding time steps before the first time step. Each of the plurality of three-dimensional subsequent datapoints and/or the plurality of three-dimensional preceding datapoints can include a subsequent voxelized LiDAR datapoint and/or preceding voxelized LiDAR datapoint, respectively. Each voxelized LiDAR datapoint can include a three-dimensional coordinate with one or more corresponding sensory observations such as, for example, gradients, image data, etc. In this manner, the logged data (e.g., the scene data 210) can include past, present, and/or future information associated with a training scene.

In addition, or alternatively, the logged data can include a vehicle pose during the collection of the sensory observations and/or high definition map data 215 at the one or more time steps. The vehicle pose, for example, can include one or more vehicle attributes (e.g., steering attributes, heading attributes, etc.) of the ego vehicle (e.g., the autonomous vehicle centered within the training scene). The map data 215 can include rasterized map data at the first time step and/or each time step of the time period. For example, the map data can include rasterized map data corresponding to the training scene and/or rasterized map data corresponding to the plurality of contextual scenes. The rasterized map data can be indicative of one or more geographical features of the training scene such as, for example, one or more travel ways, intersections, crosswalks, traffic signs, etc.

The computing system 200 can input the logged data (e.g., the map data 215, the scene data 210, vehicle pose, etc.) corresponding to the training scene into the machine-learned universal embedding model 225 to receive the universal embedding 220. In some implementations, the computing system 200 can construct representations L to provide the machine-learned universal embedding model 225 (e.g., $f_e^\theta$) with a respective field of time steps, which are preprocessed in a fully convolutional manner across the time dimension. The LiDAR data (e.g., of the scene data 210) across the time dimension T can be corrected for ego-motion to bring the point clouds (e.g., subsequent/preceding three-dimensional datapoints) from all timesteps (e.g., subsequent/preceding timesteps) into the same coordinate system, centered at the current location of the vehicle within the training scene. The computing system 200 can rasterize the space into a three-dimensional occupancy grid, where each voxel has a binary value indicating whether it contains a LiDAR point. In this manner, representations L can include dimensions H×W×(ZT), where Z and H, W are the height and x-y dimensions respectively.

In some implementations, the computing system 200 can include the map data 215 within the representation L, for example, to describe the semantics of the training scene. To do so, the computing system can rasterize the map data 215 into M channels, each representing a different element (e.g., road, intersection, lane, lane boundaries, traffic lights, etc.). In this manner, the full input representation, L, can include a tensor of size H×W×(ZT+M). The universal embedding 220 (e.g., defined by E), computed by the machine-learned universal embedding model 225 (e.g., $f_e^\theta$) can be shaped with a size H/r×W/r×$D_e$, where r is a spatial downsampling rate, and $D_e$ is the embedding dimension.

The machine-learned universal embedding model 225 can be learned to output the universal embedding 220 based on the map data 215, scene data 210, and/or vehicle pose. For example, the machine-learned universal embedding model 225 can generate the universal embedding 220 (e.g., E), for the training scene by processing the voxelized LiDAR datapoints and the rasterized map with independent backbones. The map and LiDAR features, at multiple resolutions, can be upsampled and concatenated together. The concatenated features can be input to a convolutional header to obtain the universal embedding 220.

In some implementations, the computing system 200 can determine a respective universal embedding for each of a plurality of training scenes of a training database (e.g., training database 150 of FIG. 1). For example, the computing system 200 can include and/or have access to a universal embedding database 255. The universal embedding database 255 can include a plurality of predetermined universal embeddings. Each respective universal embedding of the plurality of predetermined universal embeddings can correspond to a respective training scene indicative of a respective surrounding environment of an autonomous vehicle at a respective time step. The respective training scene, for example, can include a training scene from the training database (e.g., training database 150 of FIG. 1).

The universal embedding 220 for a respective training scene can be indicative of scene data 210 and map data 215 corresponding to the respective training scene. The universal embedding 220 for each of the plurality of training scenes of the training database can be attribute agnostic. For example, the universal embedding for each of the plurality of training scenes of the training database (e.g., 150) can be independent from each of a plurality of predefined scene attributes. This, in turn, allows the universal embedding for a respective training scene to be used to reason about any of a plurality of predefined scene attributes within the scene. For instance, a question (e.g., regional scene question 205) for a training scene can include a query attribute 206 indicative of an attribute of the training scene. A query attribute 206 can include at least one of a plurality of predefined scene attributes. The plurality of predefined scene attributes can include at least one of a vehicle action corresponding to a respective vehicle within the training scene, a density of objects within the training scene, and/or a map topology represented by the training scene.

The machine-learned universal embedding model 225 (e.g., $f_e^\theta$) can be attribute agnostic and, therefore, not depend on any particular query (e.g., about a scene attribute). This can allow the model 225 to efficiently share the computation of important intermediate features that may be relevant to multiple questions. In addition, this can enable the universal embedding 220 to be precomputed for fast question answering beneficial in a retrieval setting. In this manner, the universal embedding 220 can include data sufficient to determine answers to a plurality of questions concerning one or more scene attributes. For example, the same universal embedding can be used to determine a vehicle action corresponding to a respective vehicle within a scene, a density of objects within a scene, a map topology within a scene, etc.

In some implementations, the computing system 200 can determine a respective attribute embedding (e.g., attribute embedding 230) for each of the plurality of predefined attributes. Each attribute embedding, for example, can be previously computed based on a respective scene attribute. For instance, in some implementations, the computing system 200 can include and/or have access to an attribute embedding database 265. The attribute embedding database 265 can include a plurality of previously computed attribute embeddings including, for example, a respective attribute embedding for each scene attribute of a plurality of predefined scene attributes. For example, in some implementations, the attribute embedding database 265 can include an embedding matrix 235. The embedding matrix 235 can include a plurality of rows, each row corresponding to an attribute key. For instance, each row can correspond (via an attribute key) to a respective attribute embedding (e.g., 230) predetermined for a respective scene attribute (e.g., 206) of a plurality of predefined scene attributes. By way of example, the embedding matrix 235 can include a look-up matrix 235 with each row keyed to a respective attribute embedding for a respective scene attribute.

For instance, an attribute embedding representation can be learned for each predefined attribute to capture relationships between each of the predefined scene attributes. For example, attributes such as "a vehicle is braking" and "a vehicle is braking due to another vehicle" can be related because they both involve a related vehicle action (e.g., vehicle braking). Such attributes can depend on similar dimensions in an attribute embedding. Moreover, other attributes such as "map has a three-way intersection" can be related because, for example, the vehicle may be braking at the three-way intersection. The attribute embedding for each predefined scene attribute can capture these relationships through the embedding matrix 235.

By way of example, the embedding matrix 235 can include a learnable embedding matrix (e.g., defined by K) with dimensions $|X| \times D_k$, where $D_k$ is an attribute embedding dimension. In some implementations, the attribute embeddings and the universal embeddings can have equal dimensions. In addition, or alternatively, the attribute embeddings and the universal embeddings can have one or more different dimensions. Each row in the matrix 235 can correspond to an attribute $q_x \in X$. Given a question (e.g., a regional scene question 205), q, the attribute embedding function 260 can be defined $Q(\cdot)$, and $$Q(q)=K[q_x],$$

where $[\cdot]$ denotes an indexing operation. The computing system 200 can efficiently answer a question concerning a predefined scene attribute (e.g., regional scene question 205) by searching the embedding matrix 235 to quickly obtain a corresponding attribute embedding 230.

Figure 3:
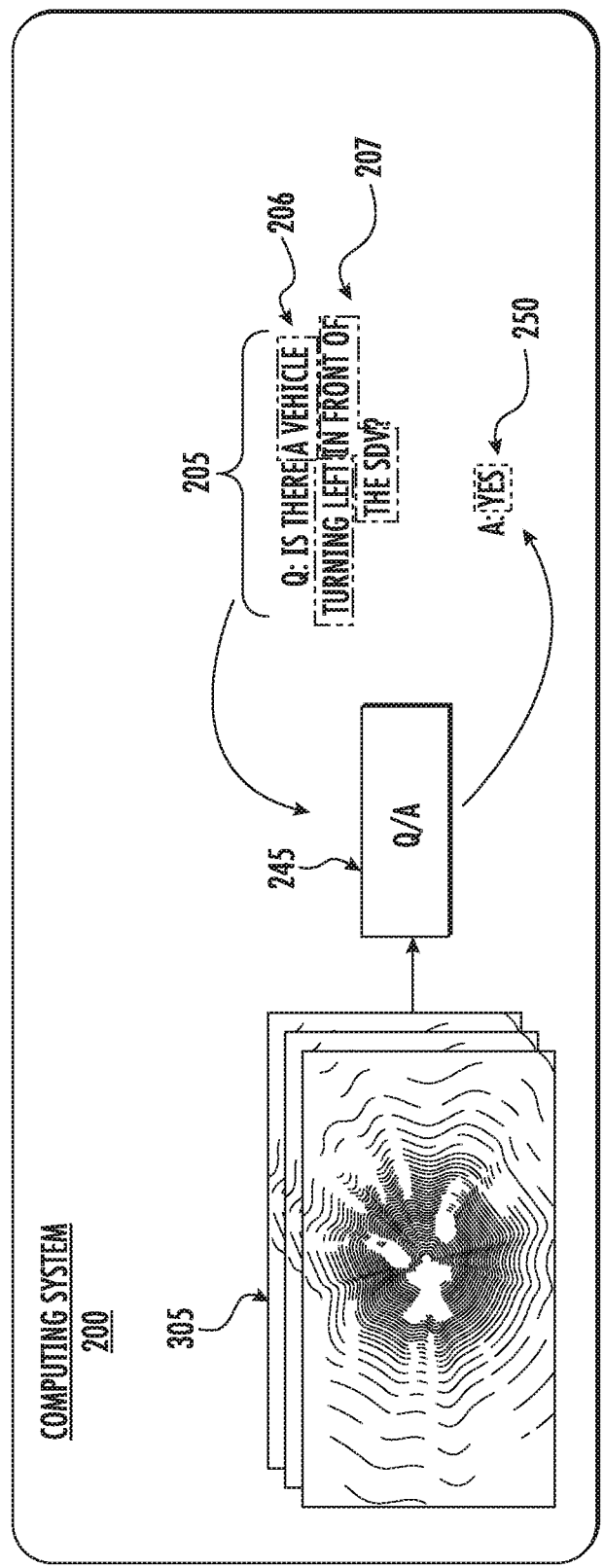
FIG. 3 depicts an example regional scene question according to example implementations of the present disclosure.

As an example, FIG. 3 depicts a regional scene question according to example implementations of the present disclosure. The computing system 200 can obtain a regional scene question 205. The regional scene question 205 can include an attribute query 206, a spatial region of interest 207, and/or a pooling function for one or more training scene(s) 305 indicative of one or more surrounding environment(s) of one or more vehicle(s). For example, the training scene(s) 305 can include one or more respective training scenes from the training database (e.g., training database 150 of FIG. 1). The spatial region of interest 207 can be indicative of a spatial area within the training scene(s) 305. The spatial area within the training scene(s) 305 can include a specific location at a specific area within the scene(s) 305 and/or a relative location at an area relative to an object with the scene(s) 305. For example, the spatial region of interest 207 can include scene coordinates indicative of a specific location. In addition, or alternatively, the spatial region of interest 207 can include a map descriptor indicative of a static area (e.g., crosswalk, intersection, etc.) within the training scene(s) 305 and/or an area relative to a dynamic object (e.g., the ego vehicle, another vehicle, a pedestrian, etc.). For instance, the vehicle (e.g., the ego vehicle) can be centered within the training scene(s) 305 and the spatial region of interest 207 can be relative to the vehicle. By way of example, the spatial region of interest 207 can include an area in front, behind, and/or to one or more sides of the vehicle centered within the training scene(s) 305. For instance, as depicted in FIG. 3, the spatial region of interest 207 can be include an area in front of a vehicle. The computing system 200 can perform a question answering problem 245 for the regional scene question 205 to obtain a regional scene answer 250 for each of the one or more training scene(s) 305.

For example, turning back to FIG. 2, the computing system can define the question answering problem 245 for the regional scene question 205 as a learning function $f$ that outputs a regional scene answer 250:

$$a = f(L, q)$$

where L is the representation of the logged data (e.g., scene data 210, map data 215, etc.) corresponding to the training scene (e.g., training scene(s) 305) within a window of time (e.g., seconds, minutes, etc.), and q is the regional scene question 205. The regional scene question 205 can be encoded as a tuple $q=(q_x, q_R, q_P)$, where $q_x \in X$ is an attribute from the plurality of predefined attributes X, $q_R$ is the spatial region of interest, and $q_P$ defines how values are pooled across the region of interest. By way of example, to encode the regional scene question 205 "How many pedestrians are within 10 meters in front of the SDV?", $q_x$ could reference a predefined "pedestrian counting" scene attribute 206, $q_R$ could encode the region 207 ten meters in front of the vehicle, and $q_P$ could encode that the attribute values at each spatial location can be pooled together via a summation function 208.

The computing system 200 can obtain at least one universal embedding 220 for the training scene (e.g., training scene(s) 305). In some implementations, the universal embedding 220 can be obtained from the universal embedding database 255. As described herein, the universal embedding 220 can be indicative of sensory data (e.g., scene data 210) corresponding to the training scene. For instance, the universal embedding 220 can be indicative of scene data 210 including a plurality of spatially-aware three-dimensional scene datapoints. In some implementations, the spatial area within the training scene can correspond to one or more of the plurality of spatially-aware three-dimensional scene datapoints. In addition, or alternatively, the computing system can be configured to retrieve a plurality of training scenes that satisfy the regional scene question 205. For example, given the training database (e.g., as defined by L), the same regional scene question (e.g., 205) can be evaluated (e.g., in the manner described herein) on all timesteps for every training scene of the plurality of training scenes. The results can be ranked by their similarity to a desired answer.

The computing system 200 can obtain an attribute embedding 230 based on the attribute query 206. The attribute query, for example, can identify a predefined attribute of the plurality of predefined attributes. The attribute embedding 230 can be previously computed based on the scene attribute 206 associated with the attribute query. In this manner, the attribute embedding 230 can be one embedding of the plurality of previously computed attribute embeddings, for example, of the attribute embedding database 265. In some implementations, the computing system 200 can obtain the attribute embedding 230 by searching the embedding matrix 235 (e.g., of the embedding database 265) to retrieve the attribute embedding 230 from a respective row of the embedding matrix 235 corresponding to the scene attribute 206 associated with the attribute query. For example, given a regional scene question 205, the computing system 200 can look up an embedding representation 230 for the particular attribute.

The computing system 200 can determine an answer embedding 240 based on the universal embedding 220 and the attribute embedding 230. For example, the computing system 200 can extract relevant information from the universal embedding 220 and the attribute embedding 230 to produce an answer embedding 240 that includes an answer at each spatial location within the training scene. The answer embedding 240, for example, can include at least one answer value for each scene datapoint of the plurality of spatially-aware three-dimensional scene datapoints representing the training scene. The answer value for each scene datapoint of the plurality of three-dimensional scene datapoints, for example, can include at least one of a classification confidence score and/or a regressed value.

By way of example, given the universal embedding 220 (e.g., defined by E) and the attribute embedding (e.g., defined by k=Q(q)) as input, the computing system 200 (e.g., a machine-learned answering module 245) can return an answer embedding 240 defined:

$$A = f_a(E, k),$$

where A is a matrix of size H/r×W/r matching the spatial dimensions of the universal embedding (e.g., E). To fuse the information from the universal embedding 220 and the attribute embedding 230, the computing system 200 can use a parameter free approach. For instance, the answer at each spatial location can be:

$$f_a(E, k) = E \cdot k,$$

where multiplication can imply tensor contraction of the universal embedding (e.g., E) with the attribute embedding vector k along the embedding dimension (broadcasting). This can be facilitated, in some implementations, when $D_e = D_k$. By applying the fusion operation, the computing system 200 can obtain the spatially-arranged answer map A with dimensions H/r×W/r. The spatially-arranged answer map (e.g., answer embedding 240) can include a plurality of elements representing a classification confidence score and/or a regressed value at a given location. In some implementations, the plurality of elements (e.g., whether the elements include a classification confidence score, regressed value, etc.) can depend on the regional scene question 205 and a loss function used to train a machine-learned answering module 245.

The computing system 200 can determine a regional scene answer 250 to the regional scene question 205 based on the spatial region of interest 207 and the answer embedding 240. For example, the regional scene answer 250 can be indicative of the answer value for each of the one or more scene datapoints corresponding to the spatial area within the training scene 305. By way of example, the computing system 200 can aggregate the answer value for each scene datapoint corresponding to the spatial area within the training scene 305 based, at least in part, on the pooling function 208 of the regional scene question 205. The computing system 200 can output the regional scene answer 250 in response to the regional scene question 205.

As described herein, the pooling function 208 can indicate a manner in which answer values can be pooled together to answer a regional scene question 205. For instance, the pooling function 208 can include at least one of a summation function and/or a max function. The summation function can be configured to add a respective regressed value for each scene datapoint corresponding to a spatial area (e.g., the spatial region of interest 207) of the training scene 305. The max function can be configured to find the highest classification confidence score of each scene datapoint corresponding to the spatial area (e.g., the spatial region of interest 207) of the training scene 305. In some implementations, the pooling function 208 can be determined based on the regional scene question 205. For example, the regional scene question 205 can include a query attribute for "counting pedestrians," in such a case, the pooling function 208 can include a summation function to add every pedestrian detected within the spatial region of interest 207.

By way of example, the answering module 245 can utilize pooling to determine an answer a (e.g., regional scene answer 250) from the spatial answer map 240 (e.g., defined by A) and regional scene question 205 (e.g., defined by q), $$a = f_p(A, q).$$

For instance, in the event the regional scene question 205 relates to counting the number of pedestrians in the training scene(s), the pooling operator 208 (e.g., defined by $q_P$) can be set to the sum function. In such a case, the pooling operation 208 can include:

$$f_p(A, q) = \Sigma_{(h,w) \in q_R} A[h, w].$$

In addition, or alternatively, in the event the regional scene question 205 relates to whether a particular scenario is present somewhere in the spatial region of interest 207 (e.g., "Is the car turning right in front of the vehicle?"), the pooling function 208 can be set the max function. In such a case, the highest confidence score at any spatial location within the spatial region of interest 207 can be used as the final confidence score. For instance, the pooling function 208 can include:

$$f_p(A, q) = \max_{(h,w) \in q_R} A[h, w].$$

In some implementations, the regional scene question 205 can include a composition question. For instance, the compositional question can be expressed as tuples $q = (Q_x, g, q_R, q_P)$ where $Q_x$ can be a subset of all supported attributes $Q_x \subseteq X$, g is a compositional function, $q_R$ is the spatial region of interest 207 and $q_P$ is the pooling function 208. For each attribute $q_x \in Q_x$ the answering module 245 can compute answer maps as:

$$A_{q_x} = f_a(E, K[q_x]).$$

In addition, the answering module 245 can compose a plurality of answer maps together by:

$$A = g(\{A_{q_x} : q_x \in Q_x\}).$$

The answering module can pool results over the spatial region of interest 207 in the manner described herein.

Figure 4:
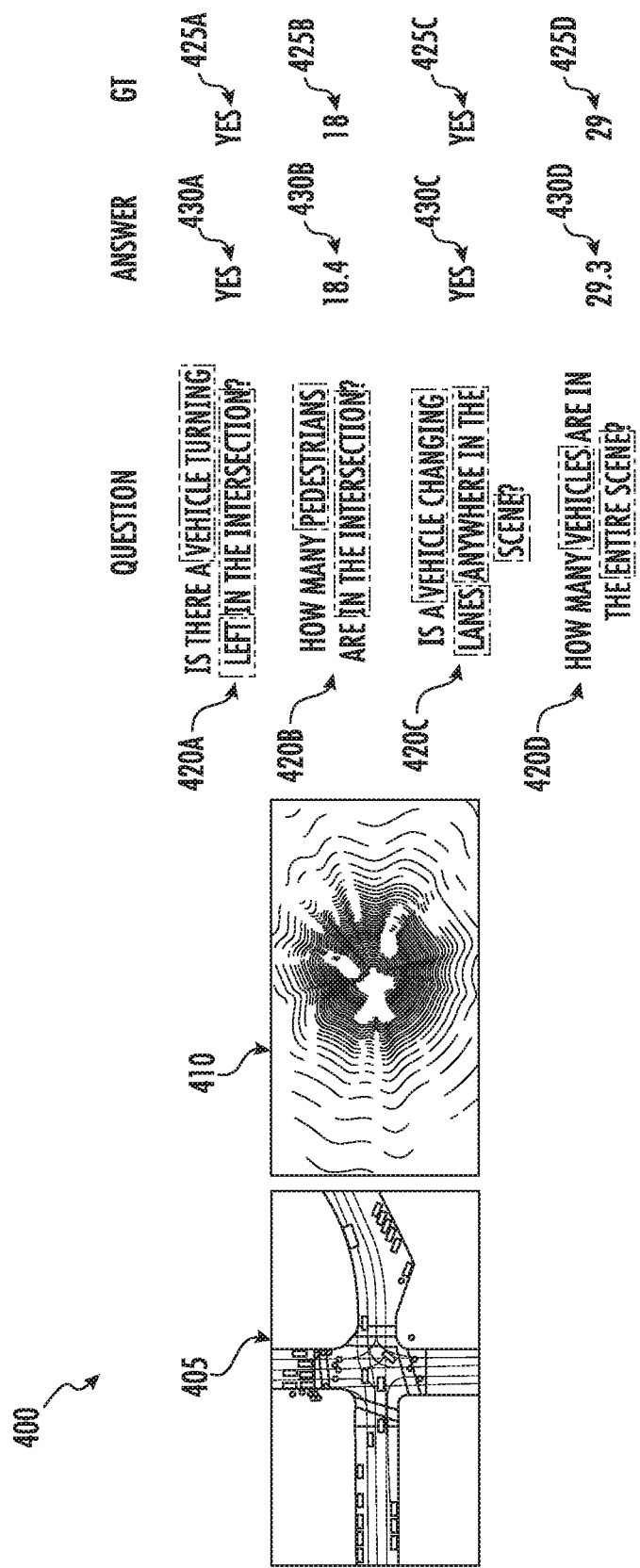
FIG. 4 depicts an example training scenario for one or more machine-learned models according to example implementations of the present disclosure.

The machine-learned models disclosed herein can be trained using one or more machine-learning techniques. For example, FIG. 4 depicts an example training scenario 400 for one or more machine-learned models according to example implementations of the present disclosure. For instance, the machine-learned universal embedding model (e.g., machine-learned universal embedding model 220) and the attribute embedding model (e.g., machine-learned attribute embedding model 230) used to determine the plurality of attribute embeddings can be jointly trained end-to-end. By way of example, the collection of model parameters can be represented as: $\Theta = \{\theta, K\}$. The computing system 200 can have access to a training dataset (e.g., training scenes from training database 150), $D_{train}$, in which each example scene 405 (e.g., denoted as (L, q, a)$\in D_{train}$) includes a data log representation L (e.g., training scene data 410, map data, etc.) at a particular time step, a regional scene question such as training questions 420a-d (e.g., denoted as q), and the ground truth data (e.g., denoted as a) such as training ground truths 425a-d. Each training ground truth 425a-d can correspond to a respective training question 420a-d. The computing system 200 can train the machine-learned models to minimize a query loss. Query loss, for example, can be determined by comparing training answers 430a-d, determined based on training question 420a-d, to the training ground truths 425a-d corresponding to the training questions 420a-d.

For example, the models can be trained to minimize loss across all training questions 420a-d from the training dataset:

$$\min_\Theta \sum_{(L,q,a) \in D_{train}} l_{q_x}(f_\Theta(L, q), a)$$

the loss function for a particular regional scene question (e.g., 420a), for example, can depend on the query attribute, $q_x$, as different loss functions can work best depending on both the support and distribution of regional scene answers 430a-d. For example, a classification loss such as cross entropy loss can be used for regional scene questions that relate to binary attributes (e.g., attribute "vehicle turning" of training question 420a, attribute "vehicle changing lanes" of training question 420c, etc.). In addition, or alternatively, a variety of loss functions such as a standard mean-squared error regression loss can be used for regional scene questions that relate to continuous valued attributes (e.g., attribute "number of pedestrians" of training question 420b, attribute "number of vehicles" of training question 420d).

In some implementations, the training set can include a subset of training scenes from the training database 150. For example, the training set can include data log representations L$\in L_{train}$ at varying time steps, with supervision for a given set of attributes $X_{train}$. In this manner, an oracle O can be implemented that provides ground-truth answers to any training question, q, $$a^* = O(L, q).$$

Given O, the computing system 200 can produce a training set, $D_{train}$, with examples (L, q, a*)$\in D_{train}$. During training of the machine-learned models, the computing system 200 can sample a query attribute, $q_x$, uniformly from $X_{train}$, then sample from a set of log frames that are "interesting" for $q_x$. For instance, for each query attribute $q_x \in X_{train}$, the computing system 200 can preprocess the dataset to find a subset of training log frames where there exists some spatial region with a positive example (for classification) or a non-zero value (for regression). This can ensure that the answer distributions for each query attribute is relatively balanced, which can stabilize training.

The machine-learned models can be trained over questions indicative of one or more spatial regions. For instance, in some implementations, the models can be trained with two types of spatial regions. For example, for all question, the models can be trained with all spatial regions that are a single pixel. This can allow the model to get explicit supervision for each spatial location independently. In addition, or alternatively, the models can be trained on questions that concern maximal region of interest (e.g., vehicle density, etc.), By way of example, in some implementations, the embedding dimensions can be set to H=160, W=280 (at a 0.5 meter per pixel resolution), Z=3 (at a 1 meter per pixel resolution), a spatial downsampling rate of r=4 and M=15 map channels. T=10 frames can be used as input to the machine-learned models. The frames can be sampled at 5 Hz. For each epoch during training, the models can sample 25000 questions per attribute and minimize loss in the manner described above. To train the parameter, an Adam optimizer can be used with a learning rate $\alpha$=0.0001 and a batch size of 10 examples per GPU. The models can be trained in three stages including a first stage where the models are trained on counting questions (e.g., vehicle density at a specific region, etc.) for thirty epochs; a second stage where the models are trained on action and interaction questions (e.g., is a vehicle turning left, etc.) for twenty epochs; and a third stage where the models are trained on map relative questions (e.g., is there an intersection in front of the vehicle, etc.) for five epochs.

Figure 5:
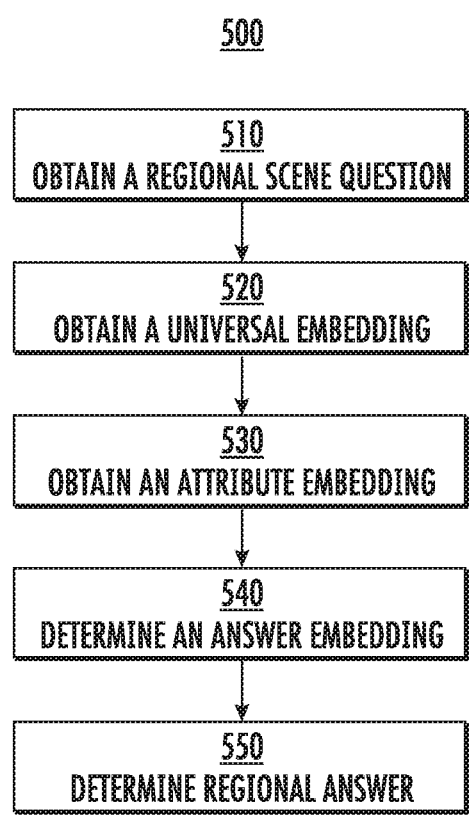
FIG. 5 depicts a flowchart of a method for answering regional scene questions according to aspects of the present disclosure.

FIG. 5 depicts a flowchart of a method for answering regional scene questions according to aspects of the present disclosure. One or more portion(s) of the method 500 can be implemented by a computing system that includes one or more computing devices such as, for example, the computing systems described with reference to the other figures (e.g., computing system 200, operations computing system(s) 104, remote computing device(s) 106, etc.). Each respective portion of the method 500 can be performed by any (or any combination) of one or more computing devices. Moreover, one or more portion(s) of the method 500 can be implemented as an algorithm on the hardware components of the device(s) described herein (e.g., as in FIGS. 1, 7, and 8 etc.), for example, to answer region specific questions. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for exemplary illustrated purposes and is not meant to be limiting. One or more portions of method 500 can be performed additionally, or alternatively, by other systems.

At 510, the method 500 can include obtaining a regional scene question. For example, a computing system (e.g., computing system 200, etc.) can obtain (e.g., via one or more machine-learned models) a regional scene question including an attribute query and a spatial region of interest for a training scene indicative of a surrounding environment of a vehicle. The spatial region of interest, for example, can be indicative of a spatial area within the training scene. By way of example, the spatial area within the training scene can corresponds to one or more of the plurality of spatially aware three-dimensional scene datapoints representing the training scene.

At 520, the method 500 can include obtaining a universal embedding. For example, a computing system (e.g., computing system 200, etc.) can obtain (e.g., via one or more machine-learned models) a universal embedding for the training scene. The universal embedding can be indicative of sensory data corresponding to the training scene. For example, the universal embedding can be indicative of scene data and map data corresponding to the training scene. The scene data can include a plurality of spatially aware three-dimensional scene datapoints representing the training scene.

In some implementations, the training scene can correspond to a first time step. The scene data can include a plurality of three-dimensional contextual datapoints representing a plurality of contextual scenes at one or more time steps different than the first time step. The plurality of three-dimensional contextual datapoints can include a plurality of three-dimensional subsequent datapoints corresponding to a subsequent time step after the first time step and a plurality of three-dimensional preceding datapoints corresponding to a preceding time step before the first time step.

At 530, the method 500 can include obtaining an attribute embedding. For example, a computing system (e.g., computing system 200, etc.) can obtain (e.g., via one or more machine-learned models) an attribute embedding based, at least in part, on the attribute query. The attribute embedding can be previously computed based, at least in part, on a scene attribute associated with the attribute query.

The attribute embedding, for example, can include one embedding of a plurality of previously computed attribute embeddings. The plurality of previously computed attribute embeddings can include a respective attribute embedding for each scene attribute of a plurality of predefined scene attributes. The plurality of predefined scene attributes can include at least one of a vehicle action corresponding to a respective vehicle, a density of objects, or a map topology represented by a respective training scene. The universal embedding can be independent from each of the plurality of predefined scene attributes.

In some implementations, the plurality of previously computed attribute embeddings can be stored in an embedding matrix. Each row of the embedding matrix can correspond to a predefined scene attribute of the plurality of predefined scene attributes. The computing system can search the embedding matrix to retrieve the attribute embedding from a respective row of the embedding matrix corresponding to the scene attribute associated with the attribute query.

At 540, the method 500 can include determining an answer embedding. For example, a computing system (e.g., computing system 200, etc.) can determine (e.g., via one or more machine-learned models) an answer embedding based, at least in part, on the universal embedding and the attribute embedding. The answer embedding, for example, can include at least one answer value for each scene datapoint of the plurality of spatially aware three-dimensional scene datapoints representing the training scene. In some implementations, the attribute embedding and the universal embedding can have equal dimensions. The answer value for each scene datapoint of the plurality of three-dimensional scene datapoints, for example, can include at least one of a classification confidence score or a regressed value.

At 550, the method 500 can include determining a regional answer. For example, a computing system (e.g., computing system 200, etc.) can determine (e.g., via one or more machine-learned models) a regional scene answer to the regional scene question based, at least in part, on the spatial region of interest and the answer embedding. The regional scene answer, for example, can be associated with the answer value for each of the one or more scene datapoints corresponding to the spatial area within the training scene.

In some implementations, the method 500 can further include outputting data indicative of the regional scene answer.

Figure 6:
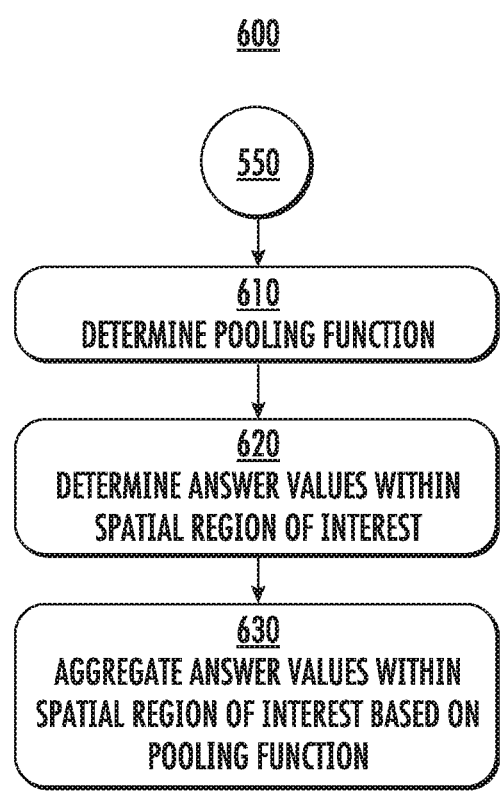
FIG. 6 depicts a flowchart of a method for determining a regional scene answer according to aspects of the present disclosure.

FIG. 6 depicts a flowchart of a method for answering regional scene questions according to aspects of the present disclosure. One or more portion(s) of the method 600 can be implemented by a computing system that includes one or more computing devices such as, for example, the computing systems described with reference to the other figures (e.g., computing system 200, operations computing system(s) 104, remote computing device(s) 106, etc.). Each respective portion of the method 600 can be performed by any (or any combination) of one or more computing devices.

Moreover, one or more portion(s) of the method 600 can be implemented as an algorithm on the hardware components of the device(s) described herein (e.g., as in FIGS. 1, 7, and 8 etc.), for example, to answer region specific questions. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

Method 600 can begin at step 550 of method 500 where method 500 includes determining a regional scene answer. At 610, the method 600 can include determining a pooling function. For example, a computing system (e.g., computing system 200, etc.) can determine the pooling function. The pooling function, for example, can be determined based, at least in part, on the regional scene question. For example, the pooling function can include at least one of a summation function configured to add a respective regressed value for each scene datapoint corresponding to the spatial area of the training scene or a max function configured to find the highest classification confidence score of each scene datapoint corresponding to the spatial area of the training scene.

At 620, the method 600 can include determining answer values within the spatial region of interest. For example, a computing system (e.g., computing system 200, etc.) can determine the answer values for each datapoint within the spatial region of interest of the answer embedding.

At 630, the method 600 can include aggregating answer values within a spatial region of interest based on a pooling function. For example, a computing system (e.g., computing system 200, etc.) can aggregate the answer value for each scene datapoint corresponding to the spatial area within the training scene based, at least in part, on a pooling function.

Figure 7:
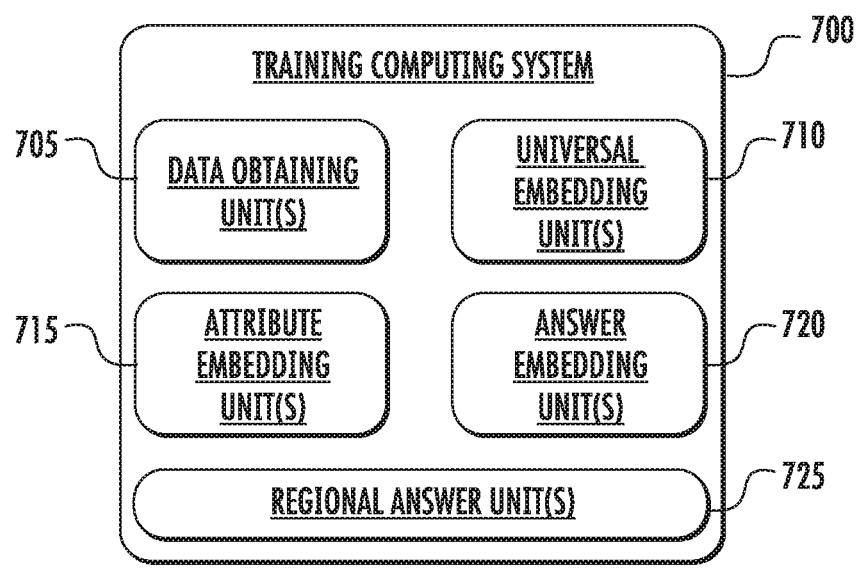
FIG. 7 depicts an example system with various means for performing operations and functions according example implementations of the present disclosure.

FIG. 7 depicts example training computing system 700 with various means for performing operations and functions according example implementations of the present disclosure. One or more operations and/or functions in FIG. 7 can be implemented and/or performed by one or more devices (e.g., one or more remote computing devices 106) or systems including, for example, the operations computing system 104, the vehicle 108, or the vehicle computing system 112, which are shown in FIG. 1. Further, the one or more devices and/or systems in FIG. 7 can include one or more features of one or more devices such as remote computing devices 106 and/or systems including, for example, the operations computing system 104, the vehicle 108, or the vehicle computing system 112, which are depicted in FIG. 1.

Various means can be configured to perform the methods and processes described herein. For example, a computing system can include data obtaining unit(s) 705, universal embedding unit(s) 710, attribute embedding unit(s) 715, answer embedding unit(s) 720, regional answer unit(s) 725, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 705, etc.) can be configured to obtain data, for example, such as a regional scene question including an attribute query and a spatial region of interest for a training scene indicative of a surrounding environment of a vehicle. The means (e.g., universal embedding unit(s) 710, etc.) can be configured to obtain a universal embedding for the training scene. The universal embedding can be indicative of scene data and map data corresponding to the training scene. For instance, the scene data can include a plurality of spatially aware three-dimensional scene datapoints representing the training scene.

The means (e.g., attribute embedding unit(s) 715, etc.) can be configured to obtain an attribute embedding based, at least in part, on the attribute query. The means (e.g., answer embedding unit(s) 720, etc.) can be configured to determine an answer embedding based, at least in part, on the universal embedding and the attribute embedding. The means (e.g., regional answer unit(s) 725, etc.) can be configured to determine a regional scene answer to the regional scene question based, at least in part, on the spatial region of interest and the answer embedding. In addition, the means (e.g., regional answer unit(s) 725, etc.) can be configured to output data indicative of the regional scene answer.

Figure 8:
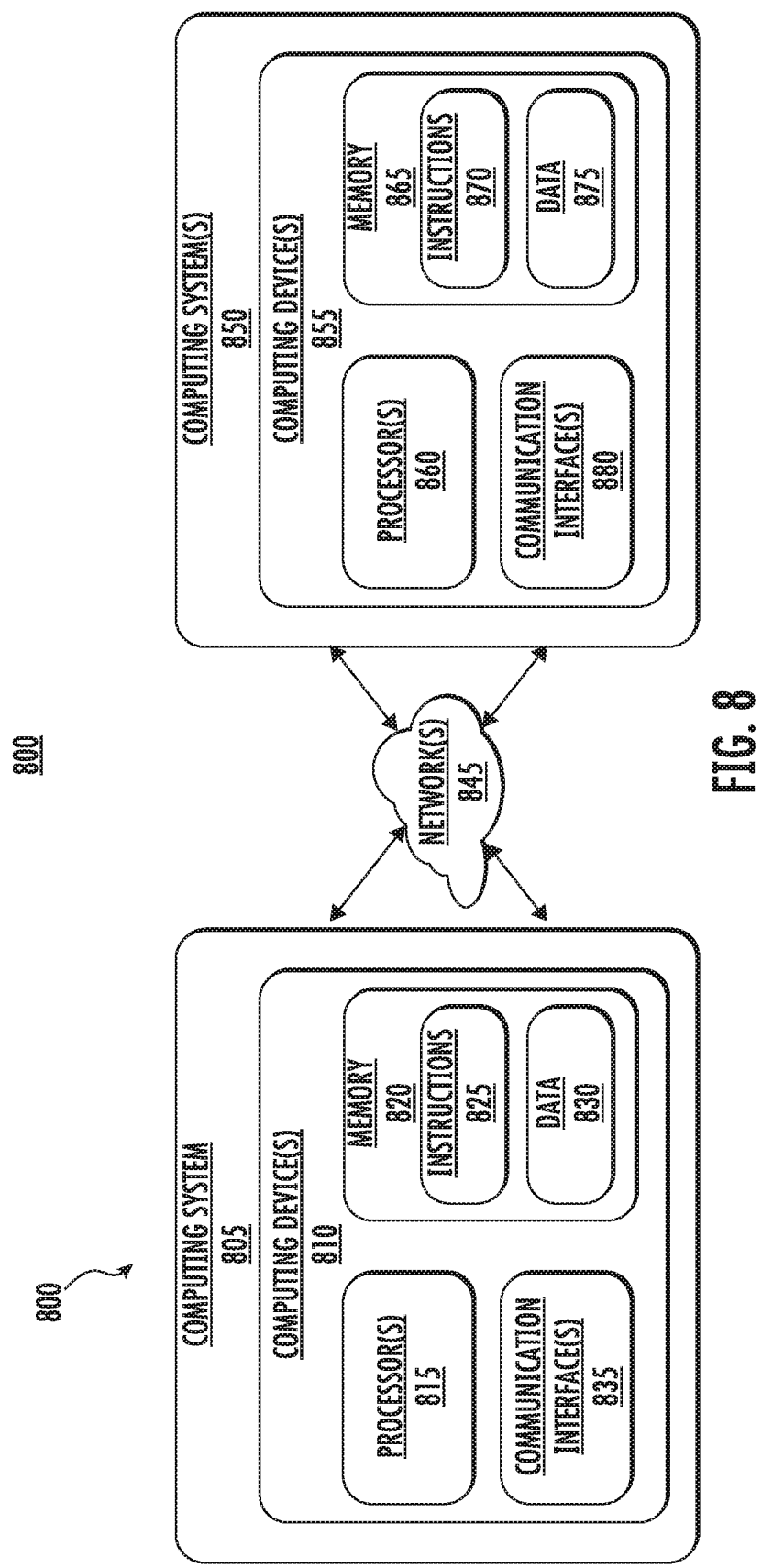
FIG. 8 depicts a block diagram of an example computing system according to example embodiments of the present disclosure.

FIG. 8 depicts example system components of an example system 800 according to example embodiments of the present disclosure. The example system 800 can include the computing system 808 (e.g., a vehicle computing system 112) and the computing system(s) 850 (e.g., operations computing system 104, remote computing device(s) 106, etc.), etc. that are communicatively coupled over one or more network(s) 845.

The computing system 805 can include one or more computing device(s) 810. The computing device(s) 810 of the computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, etc., and combinations thereof.

The memory 820 can store information that can be accessed by the one or more processors 815. For instance, the memory 820 (e.g., one or more non-transitory computer-readable storage mediums, memory devices) can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 to perform operations such as any of the operations and functions of the vehicle computing system 112, or for which the vehicle computing system 112 is configured, as described herein.

The memory 820 can store data 830 that can be obtained, received, accessed, written, manipulated, created, and/or stored. The data 830 can include, for instance, training data, scene data, map data, embedding data (e.g., attribute embedding(s), universal embedding(s), etc.), and/or other data/information described herein. In some implementations, the computing device(s) 810 can obtain from and/or store data in one or more memory device(s) that are remote from the computing system 805 such as one or more memory devices of the computing system 850.

The computing device(s) 810 can also include a communication interface 835 used to communicate with one or more other system(s) (e.g., computing system 850). The communication interface 835 can include any circuits, components, software, etc. for communicating via one or more networks (e.g., 845). In some implementations, the communication interface 835 can include for example, one or more of a communications controller, receiver, transceiver, transmitter, port, conductors, software and/or hardware for communicating data/information.

The computing system 850 can include one or more computing devices 855. The one or more computing devices 855 can include one or more processors 860 and a memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more non-transitory computer-readable storage media, such as RAM, ROM, EEPROM, EPROM, one or more memory devices, flash memory devices, etc., and combinations thereof.

The memory 865 can store information that can be accessed by the one or more processors 860. For instance, the memory 865 (e.g., one or more non-transitory computer-readable storage mediums, memory devices) can store data 875 that can be obtained, received, accessed, written, manipulated, created, and/or stored. The data 875 can include, for instance, training data, scene data, map data, embedding data (e.g., universal embedding(s), attribute embedding(s), answer embedding(s), etc.), and/or other data or information described herein. In some implementations, the computing system 850 can obtain data from one or more memory device(s) that are remote from the computing system 850.

The memory 865 can also store computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860. For example, the memory 865 can store instructions 870 that when executed by the one or more processors 860 cause the one or more processors 860 to perform any of the operations and/or functions described herein, including, for example, any of the operations and functions of the operations computing system 102, remote computing devices 106, and/or other operations and functions.

The computing device(s) 855 can also include a communication interface 880 used to communicate with one or more other system(s). The communication interface 880 can include any circuits, components, software, etc. for communicating via one or more networks (e.g., 845). In some implementations, the communication interface 880 can include for example, one or more of a communications controller, receiver, transceiver, transmitter, port, conductors, software and/or hardware for communicating data/information.

The network(s) 845 can be any type of network or combination of networks that allows for communication between devices. In some embodiments, the network(s) 845 can include one or more of a local area network, wide area network, the Internet, secure network, cellular network, mesh network, peer-to-peer communication link and/or some combination thereof and can include any number of wired or wireless links. Communication over the network(s) 845 can be accomplished, for instance, via a network interface using any type of protocol, protection scheme, encoding, format, packaging, etc.

FIG. 8 illustrates one example system 800 that can be used to implement the present disclosure. Other computing systems can be used as well. Computing tasks discussed herein as being performed at vehicle computing device(s) can instead be performed remote from the vehicle (e.g., via the operations computing system, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A computer-implemented method, the method comprising:

obtaining, by a computing system comprising one or more computing devices, a regional scene question comprising an attribute query and for a training scene indicative of a surrounding environment of a vehicle;

obtaining, by the computing system, a universal embedding for the training scene, wherein the universal embedding is indicative of scene data and map data corresponding to the training scene, wherein the scene data comprises a plurality of spatially aware three-dimensional scene datapoints representing the training scene;

obtaining, by the computing system, an attribute embedding based, at least in part, on the attribute query;

determining, by the computing system, an answer embedding based, at least in part, on the universal embedding and the attribute embedding;

determining, by the computing system, a regional scene answer to the regional scene question based, at least in part, on the answer embedding; and outputting, by the computing system, data indicative of the regional scene answer.

2. The computer-implemented method of claim 1, wherein the regional scene question comprises a spatial region of interest indicative of a spatial area within the training scene, wherein the spatial area within the training scene corresponds to one or more of the plurality of spatially aware three-dimensional scene datapoints representing the training scene; and wherein the regional scene answer to the regional scene question is based, at least in part, on the spatial region of interest.

3. The computer-implemented method of claim 2, wherein the answer embedding comprises at least one answer value for each scene datapoint of the plurality of spatially aware three-dimensional scene datapoints representing the training scene, and wherein the regional scene answer is associated with the answer value for each of the one or more of the plurality of spatially aware three-dimensional scene datapoints corresponding to the spatial area within the training scene.

4. The computer-implemented method of claim 3, wherein determining the regional scene answer to the regional scene question based, at least in part, on the spatial region of interest and the answer embedding comprises:

aggregating, by the computing system, the answer value for each scene datapoint corresponding to the spatial area within the training scene based, at least in part, on a pooling function.

5. The computer-implemented method of claim 4, wherein the pooling function is determined based, at least in part, on the regional scene question.

6. The computer-implemented method of claim 4, wherein the answer value for each scene datapoint of the plurality of spatially aware three-dimensional scene datapoints comprises at least one of a classification confidence score or a regressed value.

7. The computer-implemented method of claim 5, wherein the pooling function comprises at least one of a summation function configured to add a respective regressed value for each scene datapoint corresponding to the spatial area of the training scene or a max function configured to find a highest classification confidence score of each scene datapoint corresponding to the spatial area of the training scene.

8. The computer-implemented method of claim 1, wherein the training scene corresponds to a first time step, and wherein the scene data comprises a plurality of three-dimensional contextual datapoints representing a plurality of contextual scenes at one or more time steps different than the first time step.

9. The computer-implemented method of claim 8, wherein the plurality of three-dimensional contextual datapoints comprise a plurality of three-dimensional subsequent datapoints corresponding to a subsequent time step after the first time step and a plurality of three-dimensional preceding datapoints corresponding to a preceding time step before the first time step.

10. The computer-implemented method of claim 1, wherein the attribute embedding is one embedding of a plurality of previously computed attribute embeddings, wherein the plurality of previously computed attribute embeddings comprise a respective attribute embedding for each scene attribute of a plurality of predefined scene attributes; wherein the plurality of predefined scene attributes comprise at least one of a vehicle action corresponding to a respective vehicle, a density of objects, or a map topology represented by a respective training scene.

11. A computing system onboard a vehicle, the computing system comprising:

one or more processors; and one or more non-transitory computer-readable media that collectively store instructions that, when executed by the one or more processors, cause the system to perform operations, the operations comprising:

obtaining, by one or more machine-learned models, a universal embedding for a training scene, wherein the universal embedding is indicative of sensory data corresponding to the training scene;

obtaining, by the one or more machine-learned models, an attribute embedding based, at least in part, on at least one intended training label, wherein the attribute embedding is previously computed based, at least in part, on a scene attribute associated with the at least one intended training label;

determining an answer embedding based, at least in part, on the universal embedding and the attribute embedding;

generating a training label for the training scene based, at least in part, on the universal embedding and the attribute embedding; and storing the training label with the training scene.

12. The computing system of the claim 11, wherein the attribute embedding is one embedding of a plurality of previously computed attribute embeddings, wherein the plurality of previously computed attribute embeddings comprise a respective attribute embedding for each scene attribute of a plurality of predefined scene attributes.

13. The computing system of claim 12, wherein the plurality of predefined scene attributes comprise at least one of a vehicle action corresponding to a respective vehicle, a density of objects, or a map topology represented by a respective spatial region of interest of a respective training scene.

14. The computing system of claim 12, wherein the plurality of previously computed attribute embeddings are stored in an embedding matrix, wherein each row of the embedding matrix corresponds to a predefined scene attribute of the plurality of predefined scene attributes.

15. The computing system of claim 14, wherein obtaining the attribute embedding comprises:

searching the embedding matrix to retrieve the attribute embedding from a respective row of the embedding matrix corresponding to the scene attribute associated with the at least one intended training label.

16. A computing system, the computing system comprising:

a universal embedding database comprising a plurality of predetermined universal embeddings, each respective universal embedding of the plurality of predetermined universal embeddings corresponding to a respective training scene indicative of a respective surrounding environment of a vehicle at a respective time step;

an attribute embedding database comprising an embedding matrix, the embedding matrix comprising a plurality of rows, each row corresponding to a respective attribute embedding predetermined for a respective scene attribute of a plurality of predefined scene attributes;

one or more processors; and
one or more non-transitory computer-readable media that collectively store instructions that, when executed by the one or more processors, cause the system to perform operations, the operations comprising:
  obtaining a regional scene question comprising an attribute query and a spatial region of interest;
  obtaining a universal embedding from the universal embedding database;
  obtaining an attribute embedding based, at least in part, on the attribute query;
  determining an answer embedding based, at least in part, on the universal embedding and the attribute embedding; and
  determining a regional scene answer to the regional scene question based, at least in part, on the spatial region of interest and the answer embedding.

17. The computing system of claim 16, wherein each respective universal embedding of the plurality of predetermined universal embeddings are indicative of map data and scene data corresponding to the respective training scene.

18. The computing system of claim 17, wherein each respective universal embedding is determined by inputting the map data and scene data corresponding to the respective training scene into a machine-learned universal embedding model to receive a respective universal embedding as an output of the machine-learned universal embedding model.

19. The computing system of claim 16, wherein each respective universal embedding is independent from each of the plurality of predefined scene attributes.

20. The computing system of claim 16, wherein the answer embedding and the universal embedding have equal dimensions.

* * * * *